United States Patent [19]

Kashiyama et al.

[11] Patent Number: 5,404,191
[45] Date of Patent: Apr. 4, 1995

[54] CAMERA WITH POWER ZOOM FUNCTION AND INTERCHANGEABLE LENS WITH POWER ZOOM FUNCTION WITH A TIME-CONTROLLED LENS POSITIONING FEATURE

[75] Inventors: Ritsuo Kashiyama, Kawasaki; Hiroyuki Kataoka, Ohmiya, both of Japan

[73] Assignee: Canon Kabushiki Kaisha, Tokyo, Japan

[21] Appl. No.: 236,158

[22] Filed: May 2, 1994

Related U.S. Application Data

[60] Continuation of Ser. No. 46,203, Apr. 13, 1993, abandoned, which is a division of Ser. No. 958,456, Oct. 7, 1992, Pat. No. 5,231,437, which is a continuation of Ser. No. 705,014, May 22, 1991, abandoned, which is a division of Ser. No. 521,664, May 10, 1990, abandoned.

[30] Foreign Application Priority Data

| May 10, 1989 | [JP] | Japan | 1-115199 |
| May 10, 1989 | [JP] | Japan | 1-115200 |
| May 17, 1989 | [JP] | Japan | 1-123456 |
| Jul. 26, 1989 | [JP] | Japan | 1-192883 |

[51] Int. Cl.⁶ ............................. G03B 5/00; G03B 13/36
[52] U.S. Cl. .................................... 354/400; 354/195.1
[58] Field of Search ................. 354/400, 195.1, 195.12

[56] References Cited

U.S. PATENT DOCUMENTS

| Re. 30,534 | 3/1981 | Harrison | 354/139 |
| 4,429,975 | 2/1984 | Shiozawa et al. | 354/202 |
| 4,607,931 | 8/1986 | Aihara | 354/400 |
| 4,839,677 | 6/1989 | Hoshino et al. | 354/195 |
| 4,860,113 | 8/1989 | Miyamoto et al. | 358/225 |
| 4,864,337 | 9/1989 | Himuro et al. | 354/152 |
| 4,866,468 | 9/1989 | Himuro et al. | 354/195.1 |
| 4,887,118 | 12/1989 | Gaewsky | 354/413 |
| 4,951,075 | 8/1990 | Tokumaru et al. | 354/400 |
| 4,958,175 | 9/1990 | Asakura et al. | 354/152 |
| 4,992,821 | 2/1991 | Kiuchi et al. | 354/484 |
| 5,038,164 | 8/1991 | Harada | 354/400 |
| 5,113,210 | 5/1992 | Kashiyama et al. | 354/400 |
| 5,122,825 | 6/1992 | Tokumaru et al. | 354/400 |

Primary Examiner—W. B. Perkey
Attorney, Agent, or Firm—Fitzpatrick, Cella, Harper & Scinto

[57] ABSTRACT

A camera system includes a zoom driving mechanism driven by a motor for varying the focal length of a lens, a detecting device for detecting the focal length of the lens, and a controller for automatically stopping the motor after a predetermined time period from the time when the detecting means detects the fact that the focal length of the taking lens reaches a telephoto end or a wide-angle end.

15 Claims, 19 Drawing Sheets

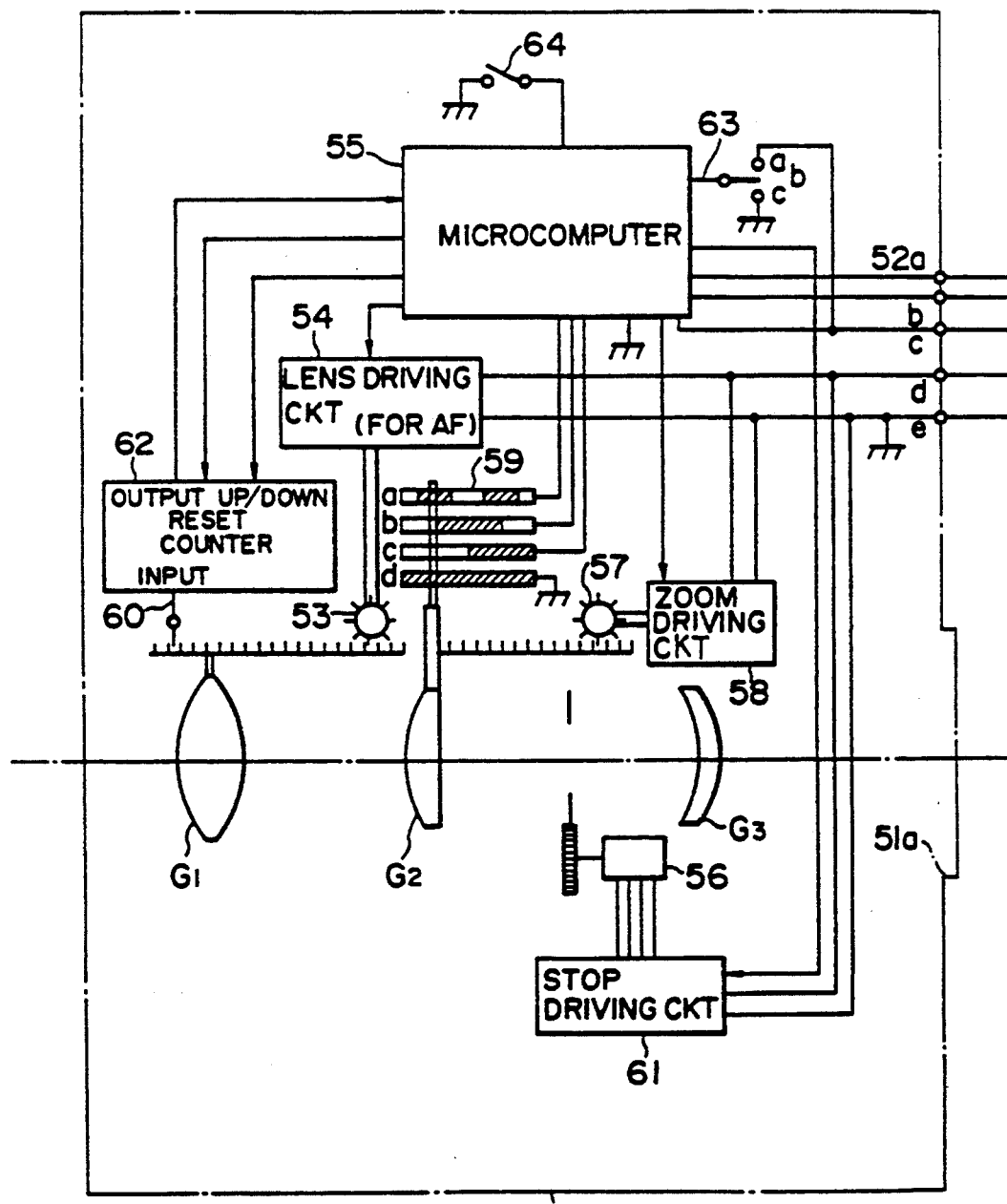

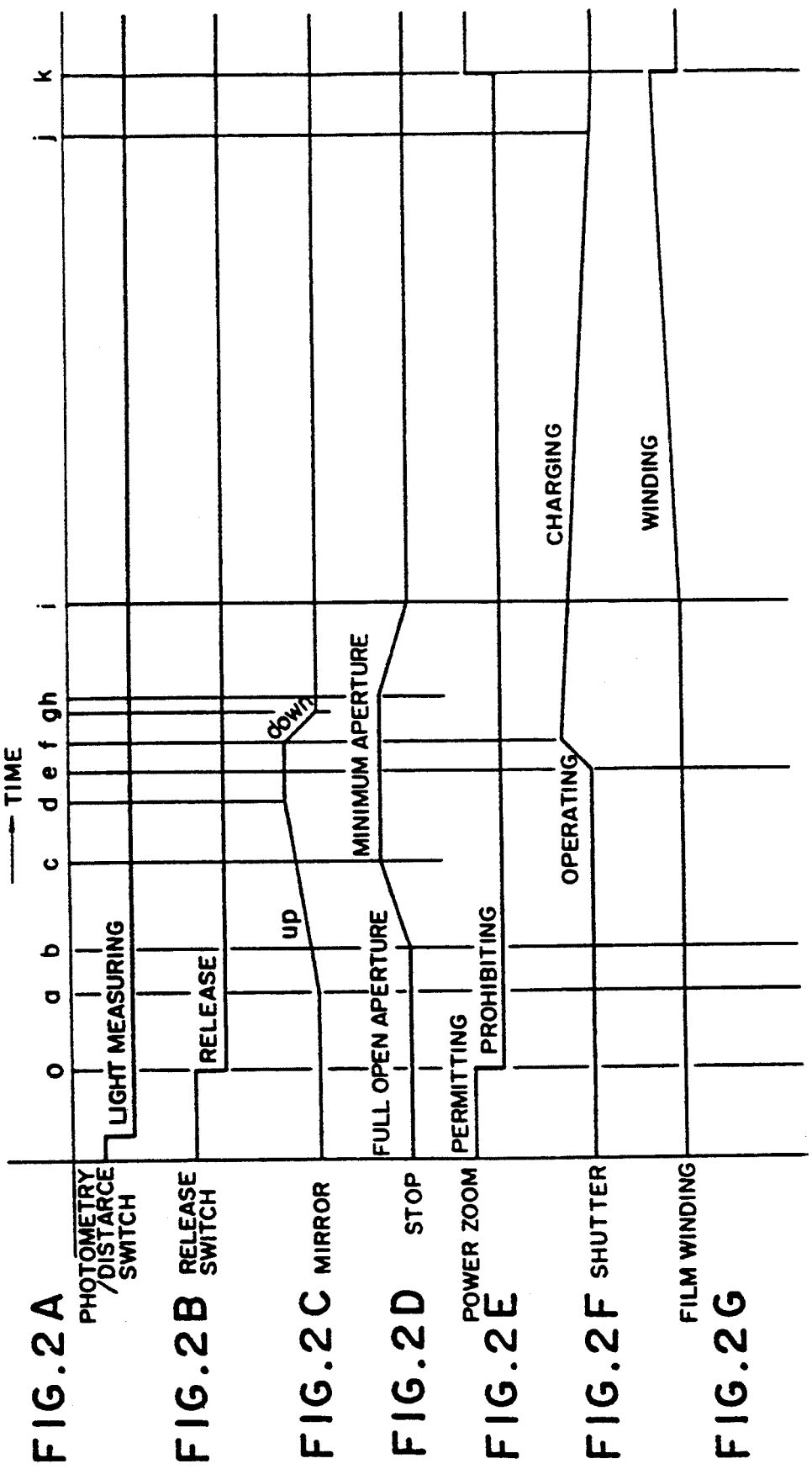

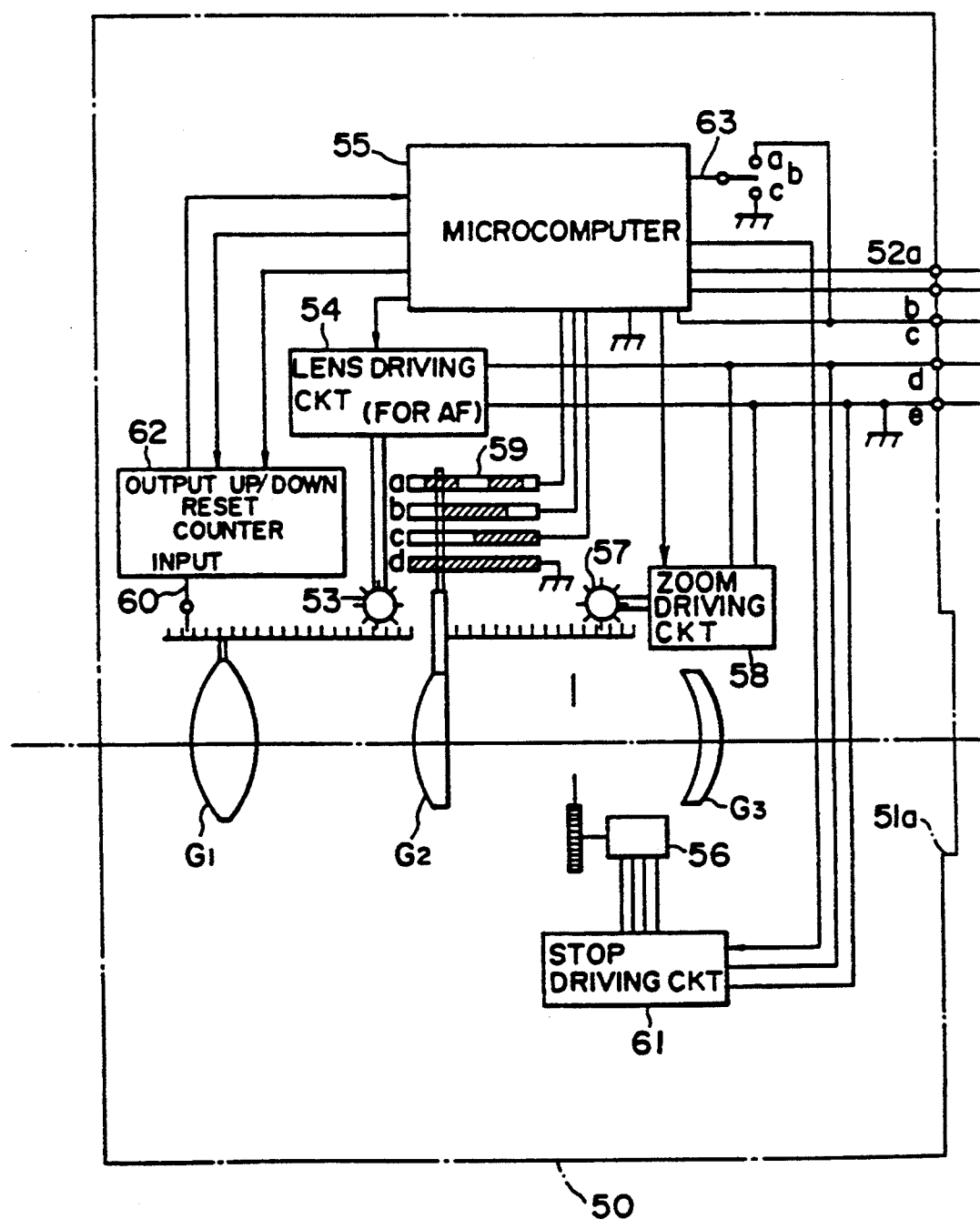

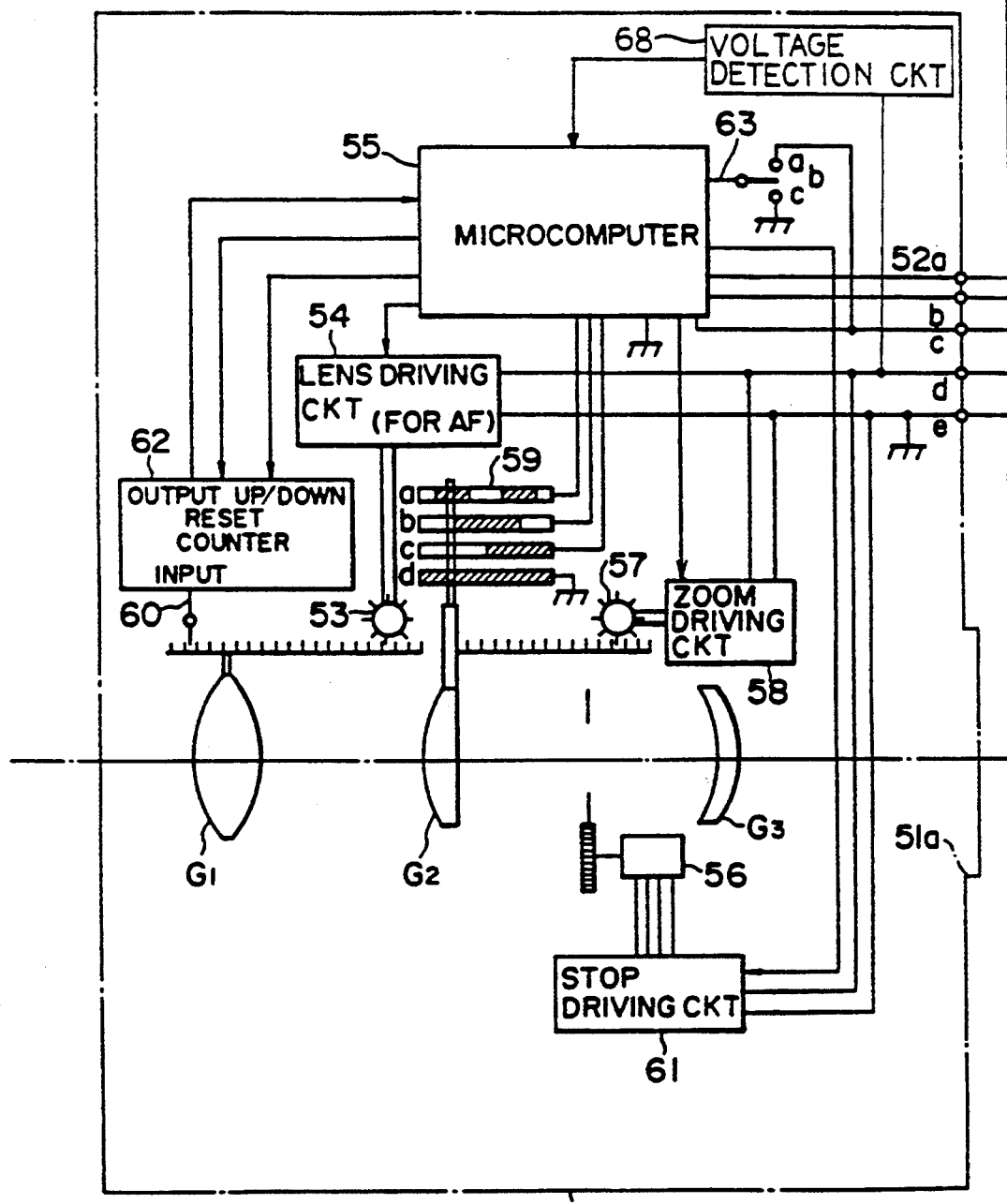

CAMERA WITH POWER ZOOM FUNCTION AND INTERCHANGEABLE LENS WITH POWER ZOOM FUNCTION WITH A TIME-CONTROLLED LENS POSITIONING FEATURE

This application is a continuation of application Ser. No. 08/046,203, filed on Apr. 13, 1993, now abandoned, which is a division of application Ser. No. 07/958,456, filed Oct. 7, 1992, now U.S. Pat. No. 5,231,437, which issued Jul. 27, 1993, which is a continuation of application Ser. No. 07/705,014, filed May 22, 1991, now abandoned, which is a divisional of application Ser. No. 07/521,664, filed May 10, 1990, now abandoned.

BACKGROUND OF THE INVENTION

1. Field of the Invention

The present invention relates to a camera with a power zoom function, an interchangeable lens with a power zoom function, and a camera body.

2. Related Background Art

Recently, the electrification of a camera system (the combination of an interchangeable lens having a power zoom function and a camera on which the interchangeable lens can be mounted) has been advanced, where various controls such as automatic exposure, winding and unwinding of a film, AF driving, stop or aperture driving, power zoom driving, and mirror-up and/or shutter charging (in case of the single lens reflex camera system) are automatically performed by using a number of motors. Accordingly, in the conventional camera systems, large-sized batteries are used as power sources for performing such controls, with the result that the whole camera systems themselves are large-sized and weighted, thus making the transportation of the camera system difficult. Further, if a small-sized battery is utilized to make the camera system small-sized, there will arise a problem that a normal or correct photo-taking operation cannot be effected.

SUMMARY OF THE INVENTION

According to one aspect, the invention is directed to a camera system using a zoom driving means driven by a motor as a driving source, for varying a focal length of a taking lens. A detecting means detects, the focal length of the taking lens. A control means for automatically stops the motor from a predetermined time period from the time when the detecting means detects the fact that the focal length of the taking lens reaches a telephoto end or a wide-angle end.

According to another aspect, the invention is directed to a camera system on which an interchangeable lens having a zoom driving means driven by a motor as a driving source, for varying a focal length of a taking lens, and a detecting means for detecting the focal length of the taking lens is mountable. The means for supplying a signal stops the motor after a predetermined time period after receiving a signal representing the fact that said focal length of said taking lens reaches a telephoto end or a wide-angle end, which is detected by the detecting means, to the interchangeable.

According to a further aspect, the invention is directed to interchangeable lens mountable on a camera body having means for applying a stop signal for automatically stopping a first motor in said interchangeable lens after a predetermined time period after receiving a signal representing the fact that the focal length reaches a telephoto end or a wide-angle end from a taking lens of the interchangeable lens, to the interchangeable lens. A zoom driving means driven by the first motor as a driving source, varies the focal length of the taking lens. A detecting means detects the focal length of the taking lens. A control means stops the first motor when it receives the stop signal.

Other objects of this invention will be apparent from the following detailed description of the invention stated hereinafter.

BRIEF DESCRIPTION OF THE DRAWINGS

FIG. 1 showing FIGS. 1A and 1B is a block diagram showing a main construction of a camera system according to a preferred embodiment of the present invention;

FIGS. 2A to 2G are timing chart for driving the camera system of FIG. 1;

FIG. 7 showing FIGS. 7A and 7B is a block diagram showing a main construction of a camera system according to a second embodiment of the present invention;

FIG. 12 showing

FIG. 13 showing FIGS. 13A and 13B is a block diagram showing a main construction of a camera system according to a fourth embodiment of the present invention;

DETAILED DESCRIPTION OF THE PREFERRED EMBODIMENTS

Figure 1B:
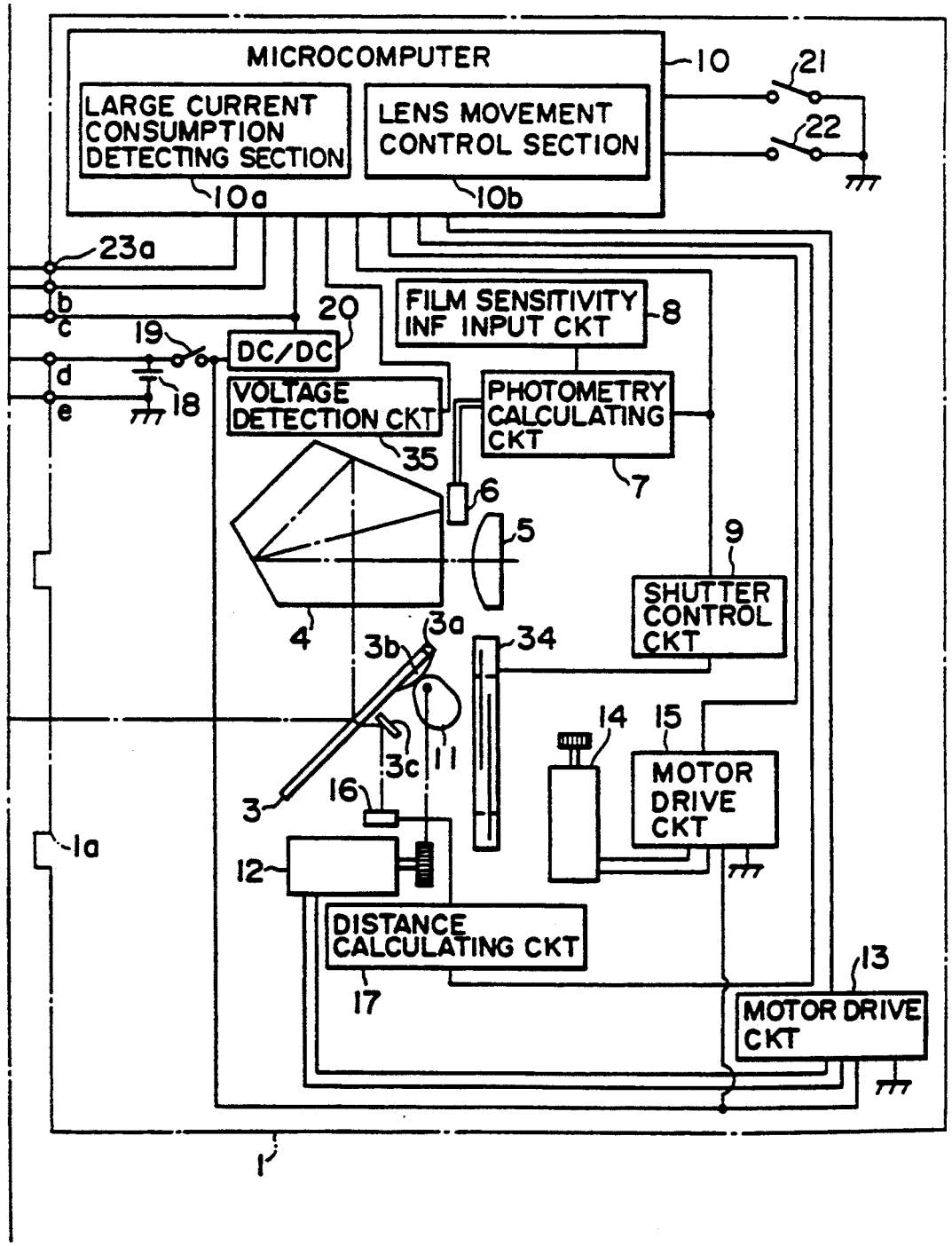

FIG. 1 is a schematic block diagram showing a main construction of a camera system according to a preferred embodiment of the present invention. In FIG. 1, the reference numeral 1 denotes a camera body; and 50 denotes an interchangeable lens detachably mounted on the camera body. These elements 1, 50 are connected to each other by a camera mount 1a and a lens mount 51a.

Within the camera body 1, there are arranged a mirror 3, a pentagonal prism 4, an eye piece 5, a photometry light receiving element 6 and a photometry calculating circuit 7 which is connected to a film sensitive information input circuit 8, a shutter control circuit 9 and a microcomputer 10. The microcomputer 10 includes a large current consumption detecting section 10a for detecting whether a large current is consumed at the camera side, and a lens movement control section 10b for permitting and prohibiting the power zoom driving in accordance with the information from the section 10a. The reference numeral 34 denotes a focal plane shutter; 3a denotes a mirror pivot shaft; and 3b denotes a mirror actuating pin engaged by a mirror driving cam 11. The reference numeral 12 denotes a mirror driving motor connected to a motor drive circuit 13; and 14 denotes a film winding and unwinding motor connected to a motor drive circuit 15. The reference numeral 16 denotes a distance sensor connected to a distance calculating circuit 17. The reference numeral 18 denotes a battery for activating the whole camera system; 19 denotes a main power source switch; and 20 denotes a DC/DC converter connected between the battery 18 and the microcomputer 10. The reference numeral 21 denotes a photometry/distance switch; and 22 denotes a release switch. Incidentally, in general, the switches 21, 22 comprise a two-stroke switch wherein upon the first stroke of a release button the switch 21 is turned ON and upon the second stroke of the release button the switch 22 is turned ON.

The reference numerals 23a–23e denote a group of contact pins arranged at a side of the camera body 1 near the camera mount 1a; and 52a–52e denote a group of contact pins arranged at a side of the interchangeable lens 50 and corresponding to the contact pins 23a–23e at the camera body side, respectively.

At the side of the interchangeable lens 50, the reference numerals G1, G2 and G3 denote optical taking lenses; and 53 denotes a lens driving motor used for adjusting the focus of the lens, which motor is connected to a lens driving circuit 54. By rotating the lens driving motor 53, a number of pulses are inputted to a counter 62 through a ratchet 60. The reference numeral 61 denotes a stop driving circuit connected to a microcomputer 55 and to a conventional pulse motor 56 by which the stop or aperture is driven. The reference numeral 57 denotes a zoom driving motor used during the zooming operation, which motor is connected to a zoom driving circuit 58. The reference numerals 59a–59e denote an encoder for transmitting the focal length of the lens to the microcomputer 55; 63 denotes a power zoom switch; and 64 denotes a change-over switch for changing modes between the AF priority mode and the power zoom priority mode.

Next, the operation of the camera system as constructed above will be explained.

First of all, the main power source switch 19 of the camera body 1 is turned ON to energize the DC/DC converter 20. As a result, the converter 20 supplies a constant operable voltage to the microcomputer 10. Then, when the photometry/distance switch 21 is depressed, the light amount detected by the photometry light receiving element 6 is transmitted to the photometry calculating circuit 7, thereby storing the exposure amount in a known manner. Further, since the photometry/distance switch 21 serves also as a trigger switch for the auto-distance, when the photometry/distance switch 21 is depressed, the distance sensor 16 is activated in response to the command from the microcomputer 10, thereby performing the distance calculation by means of the distance calculating circuit 17, determining the feeding amount of the lens, performing the conventional serial communication with the microcomputer 55 at the interchangeable lens side, and transmitting the rotational direction of the lens driving motor 53 to the lens driving circuit 54 to shift the optical taking lens G1 in a known manner. At the same time, the contents of the counter 62 is varied through the ratchet 60 in response to the movement of the optical taking lens G1. However, since the microcomputer 55 can detect the shifting amount of the lens by reading the number of pulses counted by the counter, the optical taking lens G1 can be shifted in accordance with the shifting amount of the lens commanded from the camera body side as mentioned above, and can be stopped at a focused position. Generally, the distance determining operation is performed once more, and, when the focused condition is ascertained, the focus indication such as visual indication or audible indication is given at the camera body side 1.

Next, a further operation will be explained with reference to a timing chart shown in FIG. 2. Incidentally, it should be noted that the previous operation as mentioned above was performed prior to the "0" point shown in FIG. 2. In FIG. 2, the abscissa indicates "time" and the ordinate indicates operations.

At the 0 point in FIG. 2, when the release switch 22 is depressed, the microcomputer energizes the motor drive circuit 13 to rotate the mirror driving motor 12, thereby rotating the mirror actuating cam 11 to lift the actuating pin 3b (a point "a" in FIG. 2), whereby the mirror is lifted and held at that position (a point "d" in FIG. 2). At a point "b" having a given time delay from the point "a", the conventional serial communication is performed between the microcomputer 10 at the camera body side and the microcomputer 55 at the lens side through the groups of contact pins 23a, 23b, 52a, 52b, thereby demanding the stop (aperture) setting value according to the photometry amount to the lens side. The stop setting value demanded by the camera body 1 is used in the stop driving circuit 61 as a signal for controlling the pulse motor 56. In this case, the reason why there is a given time delay between the point at which the lifting movement of the mirror is started (the point "a" in FIG. 2) and the point at which the stop is started to be driven (the point "b" in FIG. 2) is that, since the large current flows through the mirror driving motor 12 immediately after the power source switch has been turned ON, the stop driving operation should be inhibited during that period, thereby utilizing the limited power source more effectively.

Incidentally, the duration between the points "b" and "c" indicates the time when the stop-down of the stop is being effected; the point "c" indicates the time point when the stop-down has just been finished; and the duration between points "e" and "f" indicates the shutter time (seconds) controlled by the calculated result by means of the photometry calculating circuit 7 upon opening of the shutter. The duration between the points "f" and "g" given after the shutter operation has just been finished indicates the time when the mirror is being lowered; and the duration between points "h" and "i" indicates the time when the stop is returned to the full-aperture. Further, the mirror driving motor 12 serves also as a mechanical charging means for the focal plane shutter 34, and is operated up to a point "j". The completion of the stop driving (point "l") is transmitted to the microcomputer 10 at the camera body side 1 through the microcomputer 55, whereby the driving command is emitted to the motor drive circuit 15, thus winding a film through the film winding and unwinding motor 14. The winding of the film is finished at a point "k", with the result that the sequence of the camera is returned to the original condition, and the photometry/distance operation is repeated.

In the illustrated embodiment, the power zoom is not driven during the time duration between the points 0 and "k" on the basis of the information from the camera side 1 to the interchangeable lens side 50 (through the conventional serial communication), for example, even if the power zoom switch 63 is depressed.

Next, the operation at the interchangeable lens side 50 will be explained.

Figure 3:
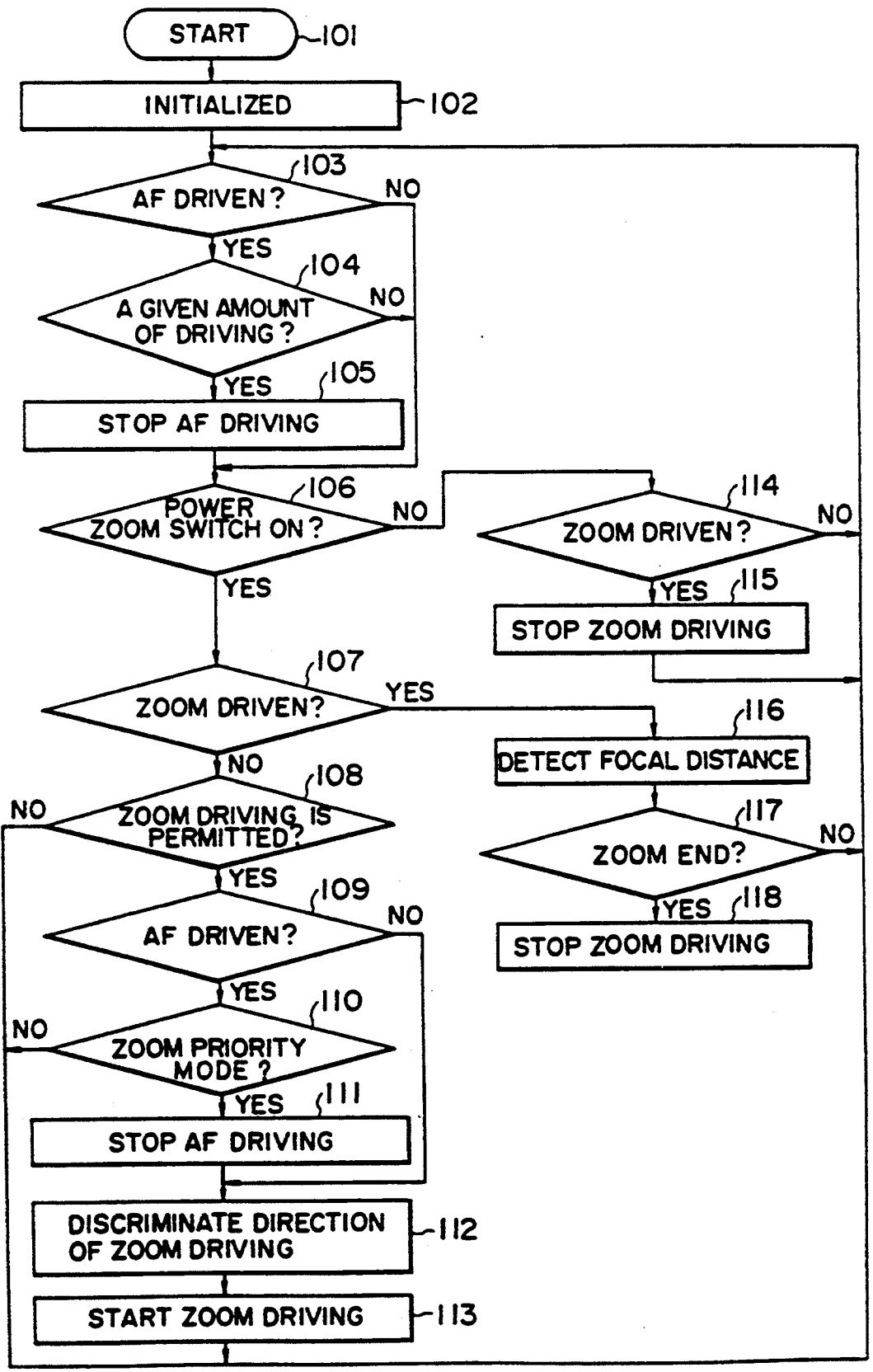
FIGS. 3 to 6 are flow charts showing the operation of the camera system of FIG. 1 at an interchangeable lens side.

FIG. 3 shows a main flowchart of the microcomputer 55 at the interchangeable lens side 50.

When the power source is turned ON, the microcomputer 55 starts the sequence from a step 101 and goes to a step 102, where various circuits within and outside the microcomputer are initialized.

Then, the sequence goes to a step 103, where it is judged whether the AF driving is being performed. If the AF driving is being performed, the sequence goes to a step 104, otherwise, to a step 106.

In the step 104, the value in the counter is read to determine the AF driving amount, and the read value is compared with a desired AF driving amount sent from the camera body side 1. If the read value reaches the desired amount, the sequence goes to a step 105 where the AF driving is stopped, and then goes to the step 106. On the other hand, if the read value does not reach the desired AF driving amount, the sequence goes to the step 106.

In the step 106, the condition of the power zoom switch 63 is judged, and if the switch is turned ON either a side or o side, the sequence goes to a step 107; whereas, if the switch is turned OFF, the sequence goes to a step 114.

In the step 114, it is judged whether the zoom driving is being performed. If the zoom driving is not performed, the sequence returns to the step 103 and the operations mentioned above are repeated. On the other hand, if the zoom driving is being performed, the sequence goes to a step 115 where the zoom driving is stopped, and then returns to the step 103.

If the power zoom switch is turned ON in the step 106, the sequence goes to the step 107, where it is judged whether the zoom driving is being performed. If the zoom driving is being performed, the sequence goes to a step 116 where the focal length is detected from the encoder 59 for detecting the focal length of the lens, and then goes to a step 117.

In the step 117, if the focal length being detected is situated in the zoom end toward which the zoom driving is directed, since a further zoom driving cannot be effected, the sequence goes to a step 118 where the zoom driving is stopped, and then returns to the step 103. On the other hand, if the focal length is not situated in the zoom end toward which the zoom driving is directed, the zoom driving is further continued, and then the sequence returns to the step 103.

If the zoom driving is not performed in the step 107, the sequence goes to a step 108 to initiate the zoom driving.

In the step 108, it is judged whether the zoom driving is permitted from a condition of a zoom permission flag in the microcomputer 55. If the zoom driving is permitted, the sequence goes to a step 109; whereas, if not permitted, the sequence returns to the step 103 without performing the zoom driving.

In the step 109, it is judged whether the AF driving is being performed. If the AF driving is not performed, the sequence goes to a step 112; whereas, if the AF driving is being performed, the sequence goes to a step 110.

In the step 110, a condition of the change-over switch 64 is detected and it is judged whether the AF priority mode or the zoom priority mode is available. If the AF priority mode is available, the AF driving is continued without performing the zoom driving, and then the sequence returns to the step 103. On the other hand, if the zoom priority mode is available, the sequence goes to a step 111 where the AF driving is stopped, and then the sequence goes to the step 112.

In the step 112, it is discriminated whether the power zoom switch 63 is turned ON at the a side or at the c side. If the switch is at the a side, it is judged that the driving should be done in the direction toward the telephoto side, whereas, if the switch is at the c side, it is judged that the driving should be done in the direction toward the wide-angle side. Thereafter, the sequence goes to a step 113.

In the step 113, the zoom driving is initiated to the driving direction determined in the step 112. Then the sequence returns to the step 103, and the sequential operations described above are repeated.

Next, the operation at the initiation of the AF driving will be explained.

When the microcomputer 55 at the interchangeable lens side 50 receives the AF driving command and the AF driving amount from the microcomputer 10 at the camera body side 1 through the communication therebetween, the microcomputer 55 initiates the AF driving by using a known offering technique.

Figure 4:
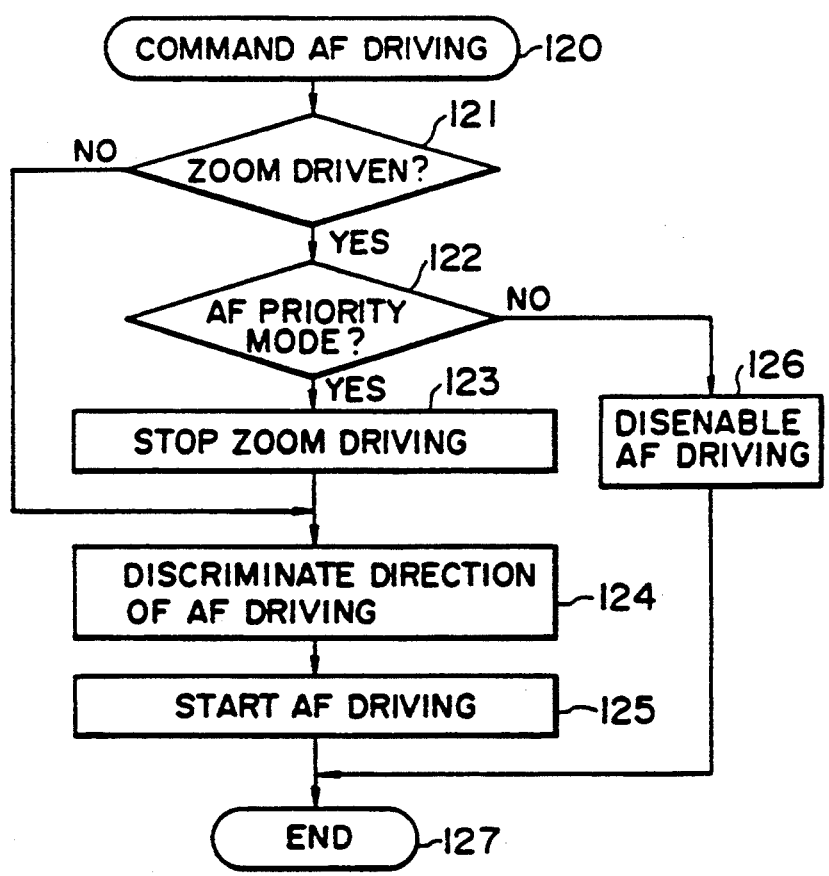

FIG. 4 is a flowchart showing the offering operation regarding the AF driving command.

In a step 120, when the offering of the AF driving command is entered, the sequence goes to a step 121, where it is judged whether the zoom driving is being performed. If the zoom driving is not performed, the sequence goes to a step 124, whereas, if the zoom driving is being performed, the sequence goes to a step 122.

In the step 122, the condition of the power zoom switch 63 is discriminated, and, if the zoom priority mode is available, since the AF driving cannot be performed, the sequence goes to a step 126, where the fact that the zoom priority mode is available and the zoom driving is being performed and the AF driving cannot be performed is transmitted to the microcomputer 10 at the camera body side 1 through the communication, and then the sequence goes to a step 127 where the offering operation is finished. On the other hand, if the AF priority mode is available in the step 122, the sequence goes to a step 123, where the zoom driving is stopped, and then the sequence goes to the step 124.

In the step 124, the driving direction information sent from the camera body side 1 is discriminated, and then the sequence goes to a step 125, where the AF driving is started. Therefore, the sequence goes to the step 127, thus finishing the offering operation.

Next, the operation regarding the permission and prohibition of the zoom driving will be explained.

With respect to the prohibition and permission of the zoom driving, in order to prohibit the zoom driving while the camera body 1 is performing the operations from the point 0 to the point "k" shown in FIG. 2, when the fact that the camera body is performing such operations is detected by the large current consumption detecting section 10a, the lens movement control section 10b in the microcomputer 10 at the camera body side 1 sends the zoom driving prohibition signal to the microcomputer 55 of the interchangeable lens side 50 at the point 0 in FIG. 2, and sends the zoom driving permission signal to the microcomputer 55 at the point "k" in FIG. 2. The microcomputer 55 at the interchangeable lens side 50 treats these signals in a known offering technique.

Figure 5:
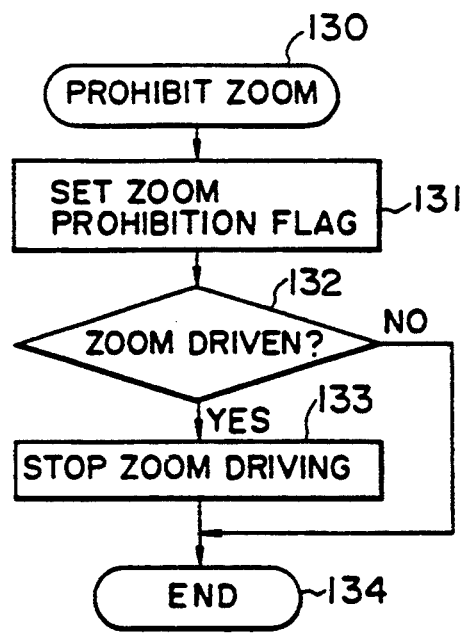

FIG. 5 is a flowchart showing the operation of the microcomputer 55 of the interchangeable lens side 50 when it receives the zoom driving prohibition signal.

When the microcomputer 55 receives the zoom driving inhibition signal in a step 130, the sequence goes to a step 131, where a zoom prohibition flag in the microcomputer is set.

Then, the sequence goes to a step 132, where it is judged whether the zoom driving is being performed. If the zoom driving is not performed, the sequence goes to a step 134, where the offering operation is finished. On the other hand, if the zoom driving is being performed, the sequence goes to a step 133, where the zoom driving is stopped, and then goes to the step 134, thus finishing the offering operation.

Figure 6:
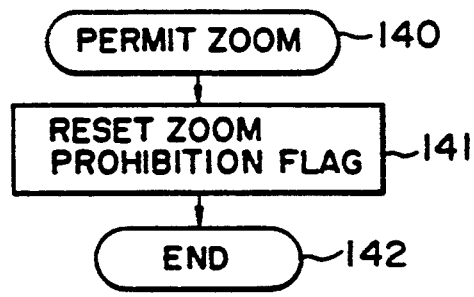

FIG. 6 is a flowchart for explaining the operation of the microcomputer 55 of the interchangeable lens side 50 when it receives the zoom driving permission signal.

When the microcomputer 55 receives the zoom driving permission signal in a step 140, the sequence goes to a step 141, where a zoom prohibition flag in the microcomputer is reset. Then, the sequence goes to a step 142, where the offering operation is finished.

Now, when the zoom prohibition flag is reset, if the power zoom switch has been turned ON, the zoom driving is initiated as mentioned above.

In the conventional camera system, when the interchangeable lens is mounted on the camera with the power zoom function using a smaller battery for the portable convenience, the camera sometimes cannot be operated correctly because it is necessary to provide the large electric power for performing the power zoom driving. To the contrary, according to the illustrated embodiment of the present invention, since the power zoom driving is prohibited while the large current is consumed in the camera body side such as in the case of the release operation, shutter charging operation and-/or film feeding operation, it is possible to make the camera system small-sized without loosing the portable convenience. Further, with this arrangement (i.e., the phototaking is permitted without performing the power zoom driving), the camera system consumes less energy, thus increasing the number of pictures that can be taken. Further, since the power zoom driving is inhibited during the release operation, the obtained pictures are not unpinted ones.

In the illustrated embodiment, while the camera system comprising the interchangeable lens having the power zoom function and the camera has been explained, the present invention may be adapted to a camera into which a lens having a power zoom function is incorporated. Further, while an example that the means for discriminating the large current consumption operations such as AF driving, stop driving, film feeding, and the like, and the means for prohibiting the power zoom driving accordingly are arranged at the camera body was explained, the camera body side may include a battery used as a common power source and the interchangeable lens side may include such means.

As mentioned above, according to the illustrated embodiment, since the power zoom driving is prohibited while the driving which consumes large current, such as the AF driving, stop driving and film feeding is being performed, thereby using the small battery effectively, providing the detecting means for judging whether any driving, other than the power zoom driving, which consumes the large current is being performed, and the operation control means for prohibiting the power zoom driving when the fact that any driving which consumes the large current is being performed is detected by the detecting means, it is possible to the normal photo-taking and to make the camera system more smaller and lighter.

Figure 7B:
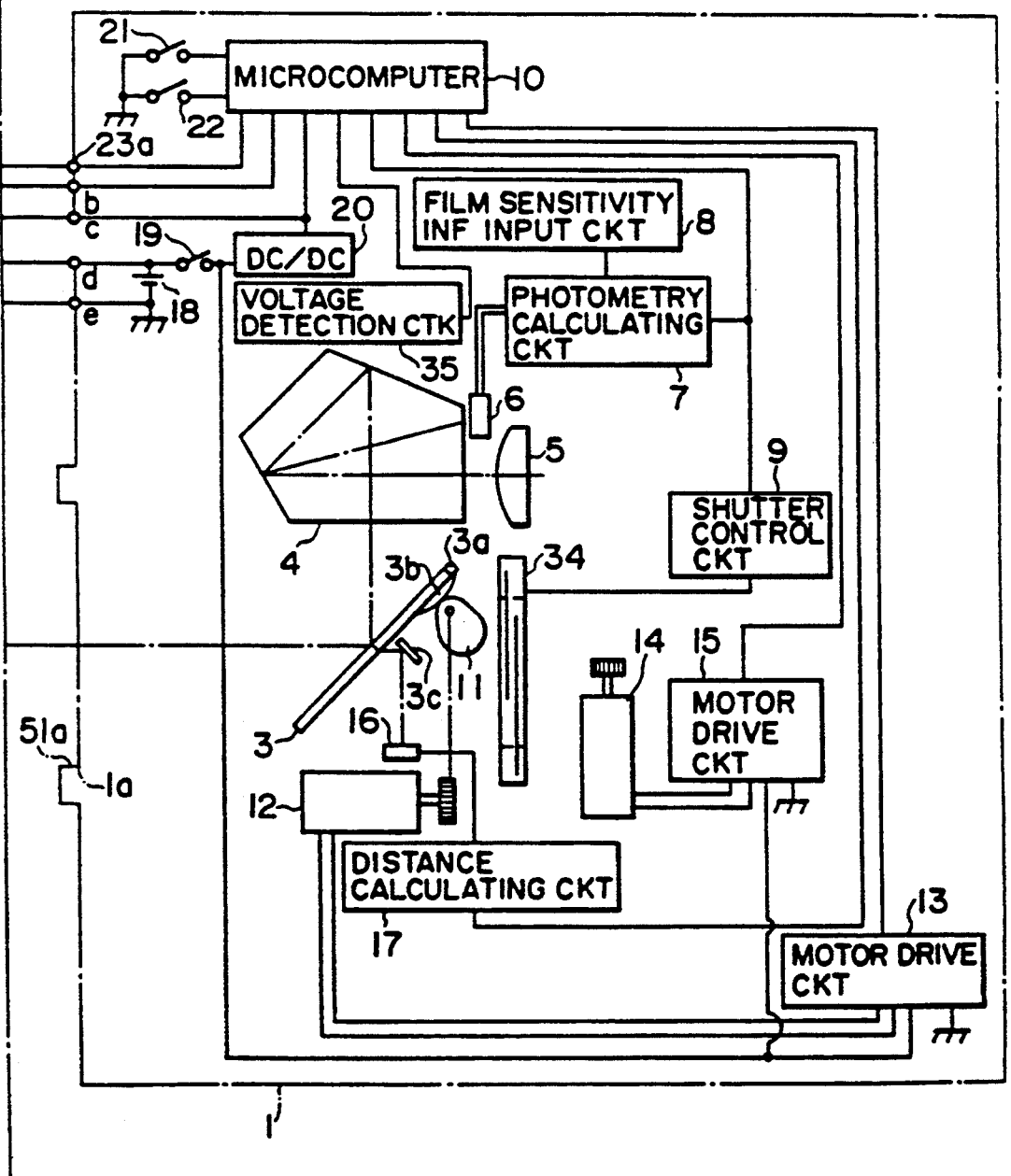

FIG. 7 is a schematic block diagram showing a main construction of a camera system according to a second embodiment of the present invention. Incidentally, the construction of FIG. 7 differs from that of FIG. 1 in the point that the microcomputer 10 of the camera body 1 does not include the large current consumption detecting section 10a and the lens movement control section 10b and that the change-over switch 64 for the interchangeable lens 50 is omitted.

Next, the operation of the camera system as constructed above will be explained.

First of all, the main power source switch 19 of the camera body 1 is turned ON to energize the DC/DC converter 20. As a result, the converter 20 supplies a constant operable voltage to the microcomputer 10. Then, when the photometry/distance switch 21 is depressed, the light amount detected by the photometry light receiving element 6 is transmitted to the photometry calculating circuit 7, thereby storing the exposure amount in a known manner. Further, since the photometry/distance switch 21 serves also as a trigger switch for the auto-distance, when the photometry/distance switch 21 is depressed, the distance sensor 16 is activated in response to the command from the microcomputer 10, thereby performing the distance calculation by means of the distance calculating circuit 17, determining the feeding amount of the lens, performing the conventional serial communication with the microcomputer 55 at the interchangeable lens side, and transmitting the rotational direction of the lens driving motor 53 to the lens driving circuit 54 to shift the optical taking lens G1 in a known manner. At the same time, the contents of the counter 62 is varied through the ratchet 60 in response to the movement of the optical taking lens G1. However, since the microcomputer 55 can detect the shifting amount of the lens by reading the number of pulses counted by the counter, the optical taking lens G1 can be shifted in accordance with the shifting amount of the lens commanded from the camera body side as mentioned above, and can be stopped at a focused position. Generally, the distance determining operation is performed once more, and, when the focused condition is ascertained, the focus indication such as a visual indication or an audible indication is given at the camera body side 1.

Incidentally, in the second embodiment, the timing of various operations are the same as those of the previous embodiment shown in FIG. 2, and, thus, the timing of the operations of the camera system of FIG. 7 will be omitted.

The aim of this second embodiment is that the lens driving motor 53 and the zoom driving motor 57 are controlled to be energized alternately, when the power zoom switch is being changed at the a side or at the c side, during the AF driving (i.e., while the lens driving motor 53 is being rotated). Since a motor has the moment of rotation inherently, if the motor is stopped for a short time, the motor continues to rotate, and, accordingly, the above control does not affect the operation of the motor. For example, the lens driving motor 53 and the zoom driving motor 57 may be energized alternately every 10 ms (in general, this control is called "duty control"). Therefore, the electric power consumed when these motors are rotated is substantially equal to the electric power consumed if either motor is continuously rotated.

Next, the operation at the interchangeable lens side 50 will be explained with reference to a flowchart.

Figure 8:
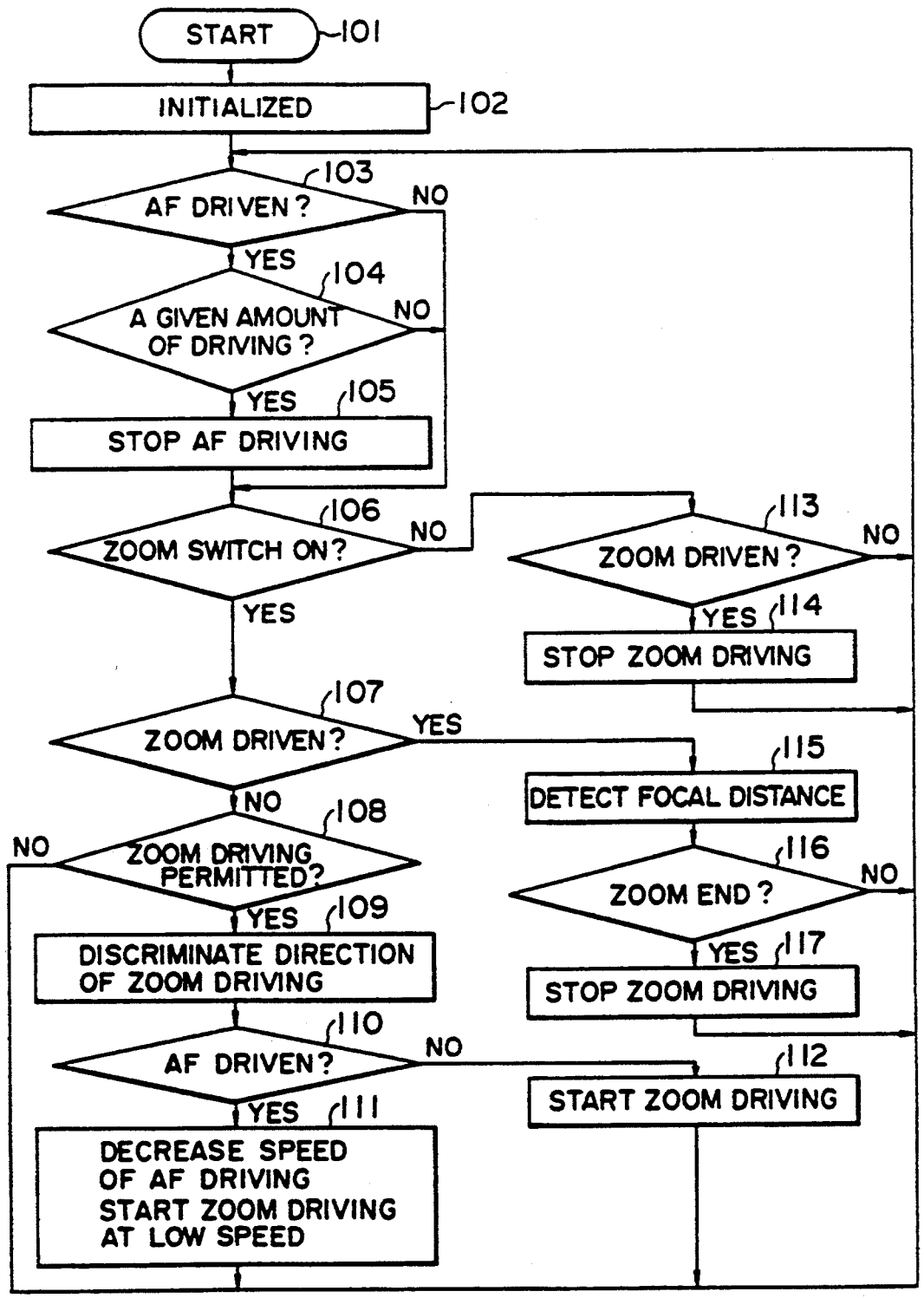
FIG. 8 to 11 are flowcharts showing the operation of the camera system of FIG. 7 at an interchangeable lens side.

FIG. 8 shows a main flowchart of the microcomputer 55 at the interchangeable lens side 50.

When the power source is turned ON, the microcomputer 55 starts the sequence from a step 101 and goes to a step 102, where various circuits within and outside the microcomputer are initialized.

Then, the sequence goes to a step 103, where it is judged whether the AF driving is being performed. If the AF driving is being performed, the sequence goes to a step 104, otherwise, to a step 106.

In the step 104, the value in the counter is read to determine the AF driving amount, and the read value is compared with a desired AF driving amount sent from the camera body side 1o If the read value reaches the desired amount, the sequence goes to a step 105 where the AF driving is stopped, and then goes to the step 106. On the other hand, if the read value does not reach the desired AF driving amount, the sequence goes to the step 106.

In the step 106, the condition of the power zoom switch 63 is judged, and if the switch is turned ON either a side or c side, the sequence goes to a step 107; whereas, if the switch is turned OFF, the sequence goes to a step 113.

In the step 113, it is judged whether the zoom driving is being performed. If the zoom driving is not performed, the sequence returns to the step 103 and the operations mentioned above is repeated. On the other hand, if the zoom driving is being performed, since the power zoom switch is turned OFF, the sequence goes to a step 114 where the zoom driving is stopped, and then returns to the step 103.

If the power zoom switch is turned ON in the step 106, the sequence goes to the step 107, where it is judged whether the zoom driving is being performed. If the zoom driving is being performed, the sequence goes to a step 115 where the focal length is detected from the encoder 59 for detecting the focal length of the lens, and then goes to a step 116.

In the step 116, if the focal length being detected is situated in the zoom end toward which the zoom driving is directed, since a further zoom driving cannot be effected, the sequence goes to a step 117 where the zoom driving is stopped, and then returns to the step 103. On the other hand, if the focal length is not situated in the zoom end toward which the zoom driving is directed, the zoom driving is further continued, and then the sequence returns to the step 103.

If the zoom driving is not performed in the step 107, the sequence goes to a step 108 to initiate the zoom driving.

In the step 108, it is judged whether the zoom driving is performed from a condition of a zoom permission flag in the microcomputer 55. If the zoom driving is permitted, the sequence goes to a step 109; whereas, if not permitted, the sequence returns to the step 103 without performing the zoom driving.

In the step 109, it is-discriminated whether the power zoom switch 63 is turned ON at the a side or at the c side. If the switch is at the a side, it is judged that the driving should be done in the direction toward the telephoto side, whereas, if the switch is at the c side, it is judged that the driving should be done in the direction toward the wide-angle side. Thereafter, the sequence goes to a step 110.

In the step 110, it is judged whether the AF driving is being performed. If the AF driving is not performed, the sequence goes to a step 112; whereas, if the AF driving is being performed, the sequence goes to a step 111.

In the step 111, in order to perform the AF driving and the zoom driving simultaneously, the AF driving motor 53 and the zoom driving motor 57 are energized alternately, thereby decreasing the speed of the AF driving so that the zoom driving is started to the direction determined in the step 109, and then the sequence returns to the step 103, from where the operations mentioned above are repeated.

In the step 112, since only the zoom is effected, the zoom driving motor 57 is always energized (it means that the duty control is not effected), whereby the zoom driving is started to the direction determined in the step 109 at a speed faster than a speed at which the AF driving and the zoom driving are simultaneously performed. Thereafter, the sequence returns to the step 103.

Figure 9:
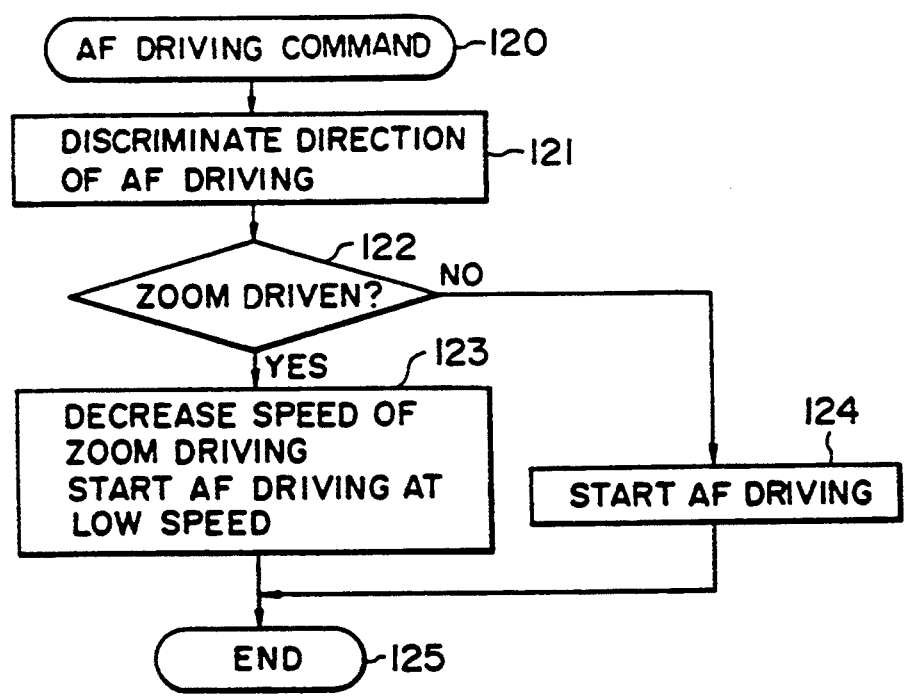

Next, the operation at the initiation of the AF driving will be explained with reference to a flowchart shown in FIG. 9.

When the microcomputer 55 at the interchangeable lens side 50 receives the AF driving command and the AF driving amount from the microcomputer 10 at the camera body side i through the communication therebetween, the microcomputer 55 initiates the AF driving by using a known offering technique.

In a step 120, when the offering of the AF driving command is entered, the sequence goes to a step 121 where the driving direction sent from the camera body side 1 is judged, and then goes to a step 122. In the step 122, it is judged whether the zoom driving is being performed. If the zoom driving is not performed, the sequence goes to a step 124, whereas, if the zoom driving is being performed, the sequence goes to a step 123.

In the step 123, in order to perform the AF driving and the zoom driving simultaneously, the AF driving motor 53 and the zoom driving motor 57 are energized alternately, thereby decreasing the speed of the AF driving so that the AF driving is started at a low speed to the direction determined in the step 121, and then the sequence goes to the step 125, where the offering operation is finished.

On the other hand, in the step 124, since only the zoom is effected, the zoom driving motor 57 is always energized, whereby the AF driving is started to the direction determined in the step 121 at a speed faster than a speed at which the AF driving and the zoom driving are simultaneously performed. Thereafter, the sequence goes to the step 125, thus finishing the offering operation.

Next, the operation regarding the permission and prohibition of the zoom driving will be explained.

With respect to the prohibition and permission of the zoom driving, in order to prohibit the zoom driving while the camera body 1 is performing the operations from the point 0 to the point "k" shown in FIG. 2, the microcomputer 10 at the camera body side 1 sends the zoom driving prohibition signal to the microcomputer 55 of the interchangeable lens side 50 at the point 0 in FIG. 2, and sends the zoom driving permission signal to the microcomputer 55 at the point "k" in FIG. 2. The microcomputer 55 at the interchangeable lens side 50 treats these signals in a known offering technique.

Figure 10:
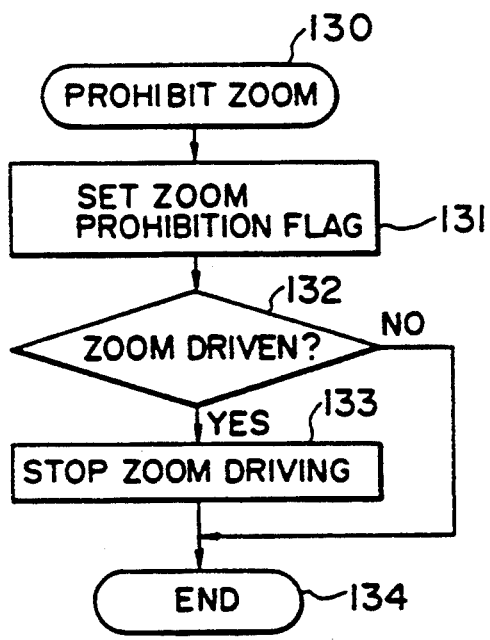

FIG. 10 is a flowchart showing the operation of the microcomputer 55 of the interchangeable lens side 50 when it receives the zoom driving prohibition signal.

When the microcomputer 55 receives the zoom driving inhibition signal in a step 130, the sequence goes to a step 131, where a zoom prohibition flag in the microcomputer is set.

Then, the sequence goes to a step 132, where it is judged whether the zoom driving is being performed. If the zoom driving is not performed, the sequence goes to a step 134, where the offering operation is finished. On the other hand, if the zoom driving is being performed, the sequence goes to a step 133, where the zoom driving is stopped, and then goes to the step 134, thus finishing the offering operation.

Figure 11:
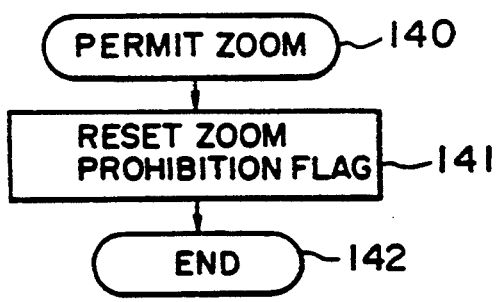

FIG. 11 is a flowchart for explaining the operation of the microcomputer 55 of the interchangeable lens side 50 when it receives the zoom driving permission signal.

When the microcomputer 55 receives the zoom driving permission signal in a step 140, the sequence goes to a step 141, where a zoom prohibition flag in the microcomputer is reset. Then, the sequence goes to a step 142, where the offering operation is finished.

Now, when the zoom prohibition flag is reset, if the power zoom switch 63 has been turned ON, the zoom driving is initiated as mentioned above.

Figure 12A:
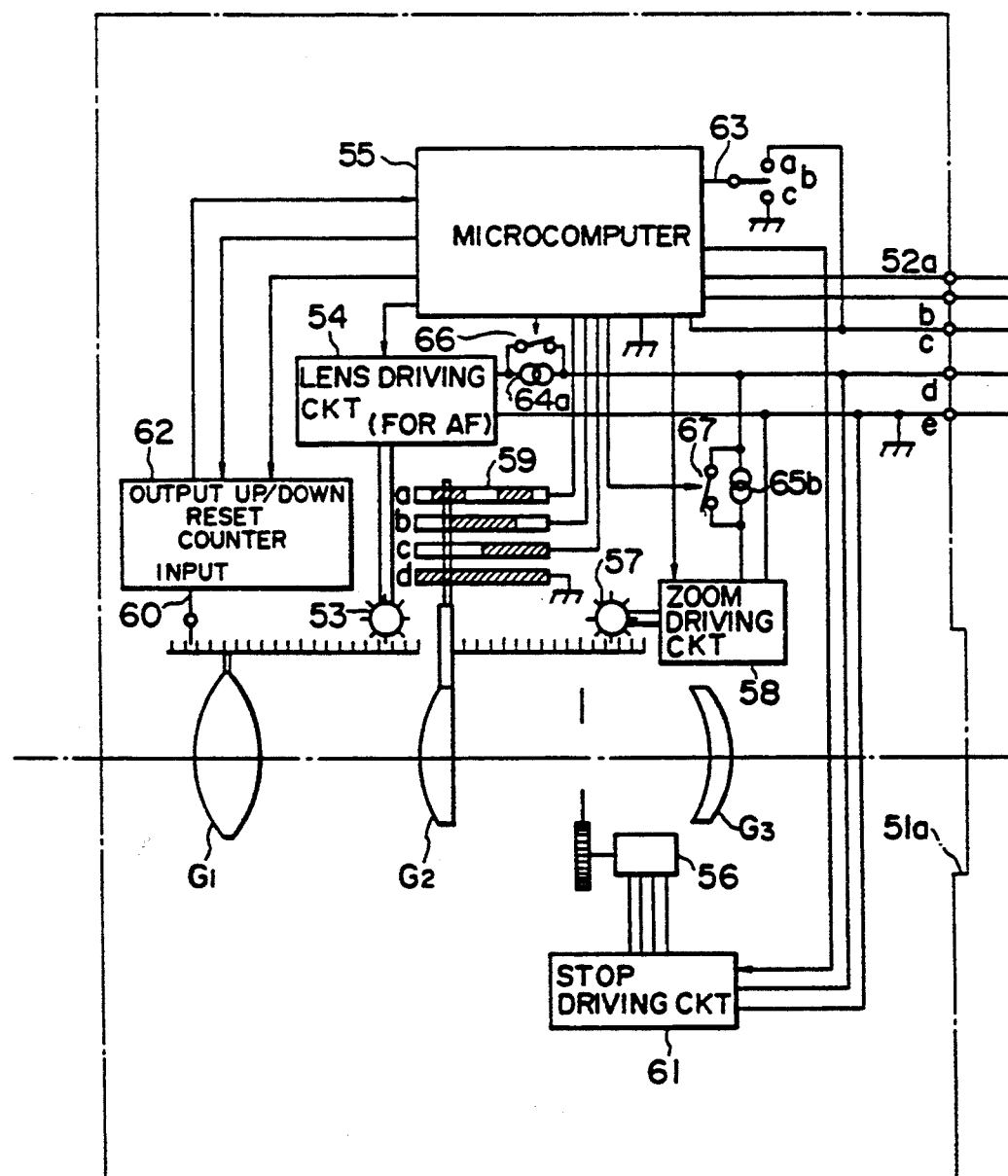
FIGS. 12A and 12B is a block diagram showing a main construction of a camera system according to a third embodiment of the present invention.
Figure 12B:
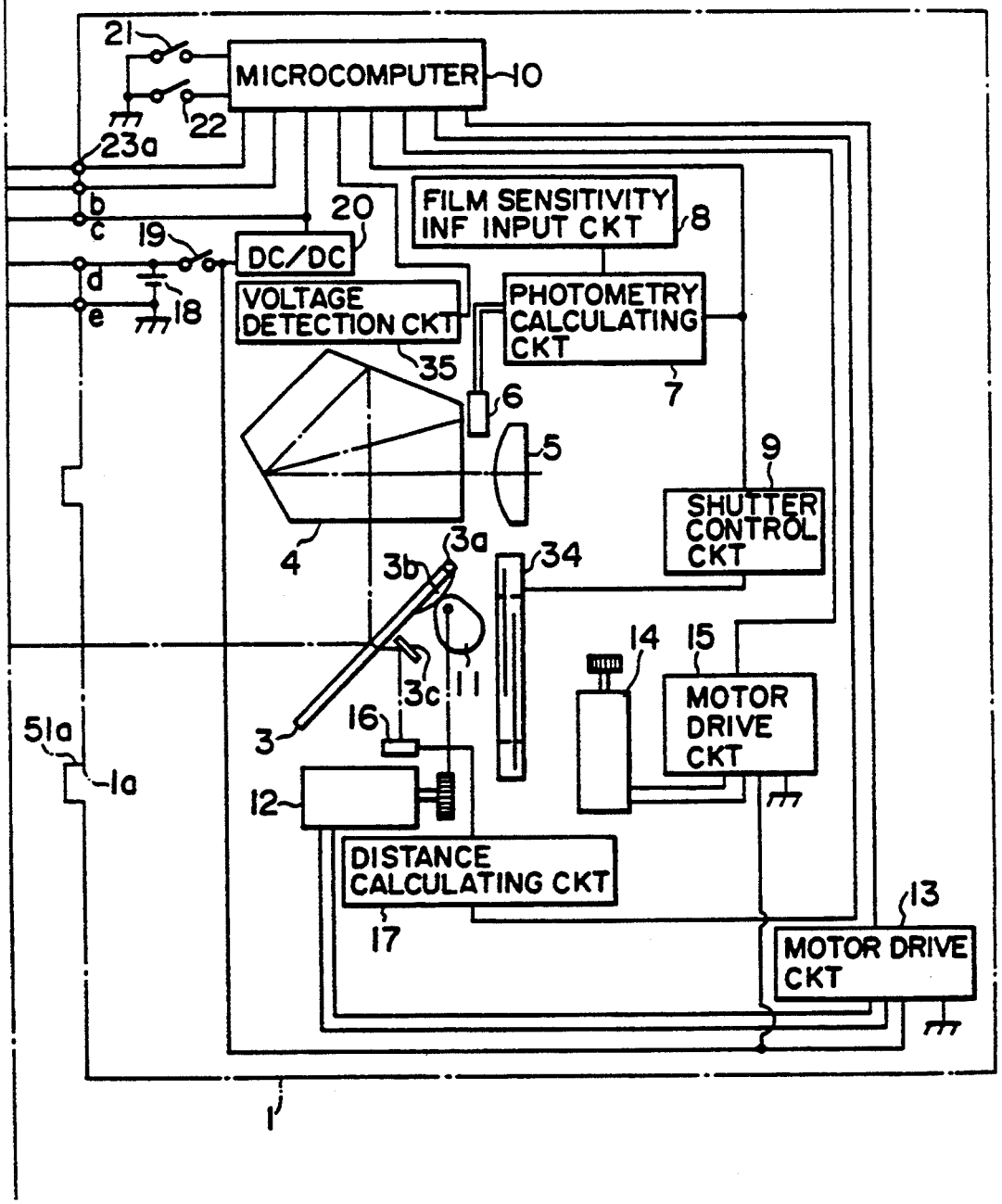

FIG. 12 is a schematic block diagram showing a main construction of a camera system according to a third embodiment of the present invention. Incidentally, the same or similar elements as those shown in FIG. 1 will be designated by the same reference numerals used in FIG. 1.

In FIG. 12, the reference numerals 64a, 65b denote constant current circuits, the constant current being set to have a value of ½ of the currents consumed by the lens driving motor 53 and the zoom driving motor 57. The reference numerals 66, 67 denote switches which can be opened in response to the command from the microcomputer 55.

Either the AF driving or the power zoom driving is to be performed, the switches 66, 67 is maintained in the ON conditions so that the normal driving is performed. On the other hand, when the AF driving and the power zoom driving are simultaneously performed, the switches 66, 67 are changed to the OFF conditions so that the ½ of the current is applied to the respective motor 53 and 57.

In the above mentioned second and third embodiments, even if the AF driving and the zoom driving are performed simultaneously, the consumed current corresponds to the current consumed by a single motor. Accordingly, the battery 18 may be small-sized, and, thus, it is possible to make the camera system more small-sized and lighter, and to meet the requirements regarding substantially all of the shutter chances. Further, since the consumed current is small even when the AF driving and the zoom driving are simultaneously performed, it is possible to solve the problem that the correct or normal photo-taking cannot be effected.

Figure 13B:
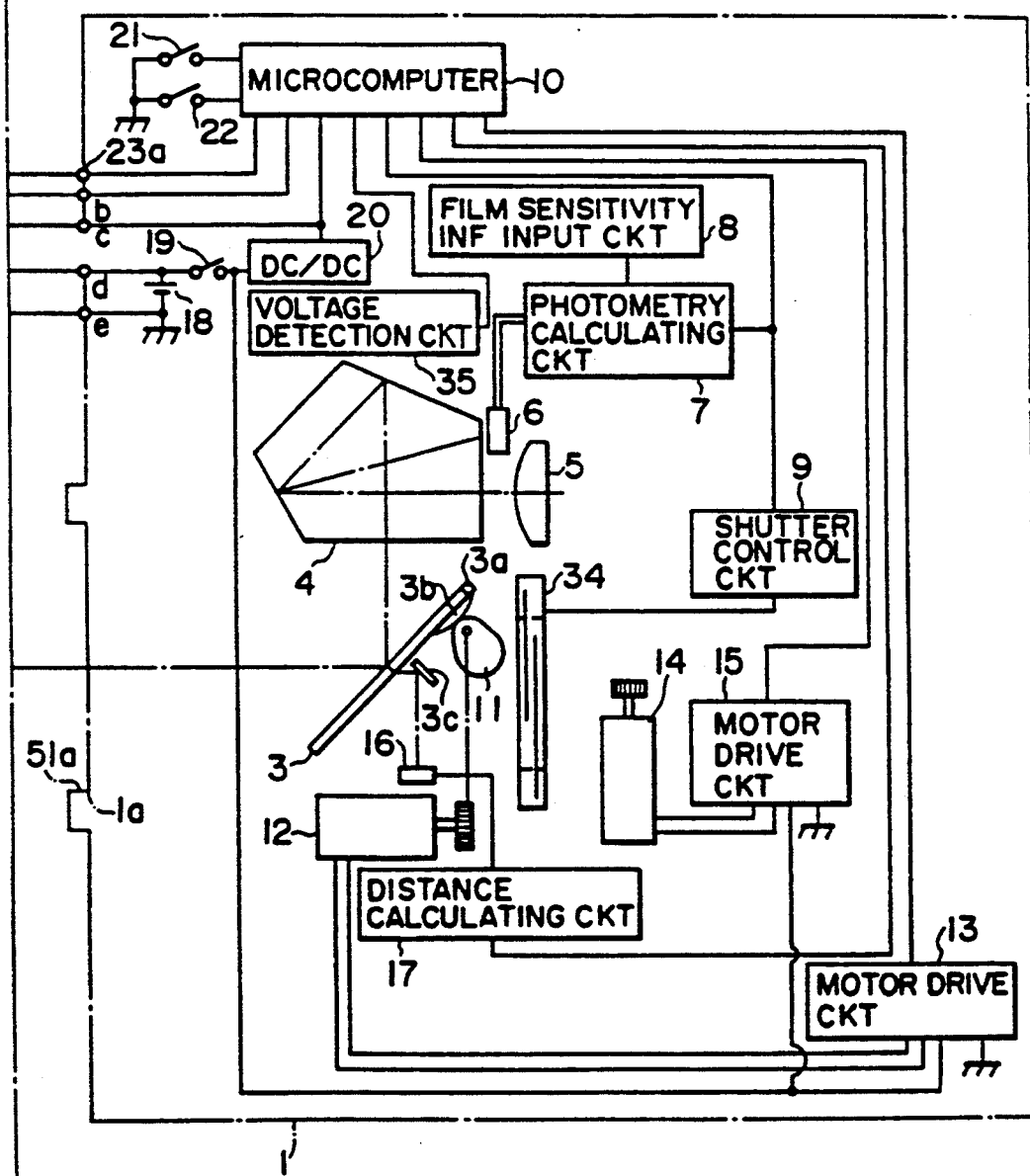

FIG. 13 is a schematic block diagram showing a main construction of a camera system according to a fourth embodiment of the present invention. Incidentally, the same or similar elements as those shown in FIG. 1 will be designated by the same reference numerals used in FIG. 1.

In FIG. 12, the reference numeral 68 denotes a voltage detecting circuit for monitoring the voltage (of the battery 18) on a power source line, which is applied from the camera body side 1 to the interchangeable lens side 50. The voltage detecting circuit may comprise a conventional A/D converter and the like.

As is known, when the battery 18 is new, it has the largest capacity (electric power) and provides the high voltage at its output terminal. In such a case, it is possible to energize a number of motors simultaneously. However, if the battery becomes old, its terminal voltage is decreased and it will be impossible to energize a number of motors simultaneously. Accordingly, in the illustrated embodiment, when the fact that the voltage on the power source line decreases below a predetermined value by means of the voltage detecting circuit 68, the simultaneous energizations of the plural motors are prevented.

Next, the operation at the interchangeable lens side 50 will be explained with reference to a flowchart.

Figure 14:
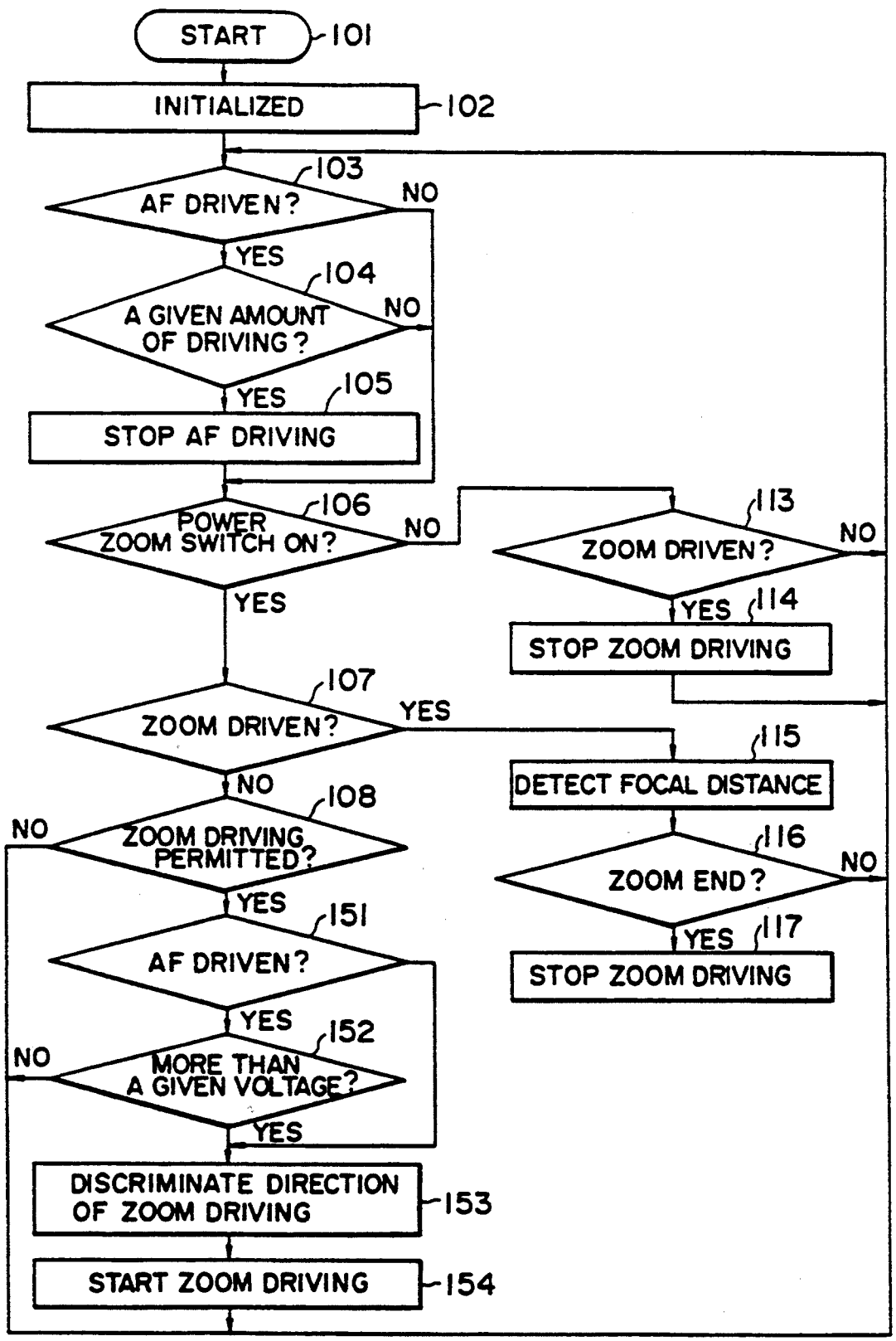
FIGS. 14 and 15 are flowcharts showing the operation of the camera system of FIG. 13 at an interchangeable lens side.

FIG. 14 shows a main flowchart of the microcomputer 55 at the interchangeable lens side 50. From a step 101 to a step 108, and from a step 113 to a step 117, the operation is the same as that of FIG. 8, and, thus, the explanation of thereof will be omitted.

In a step 151, it is judged whether the AF driving is being performed. If the AF driving is not performed, the sequence goes to a step 153, whereas, if the AF driving is being performed, the sequence goes to a step 152.

In the step 152, the power source voltage is detected by the voltage detecting circuit 68, and, if the power source voltage is more than a given voltage, since the AF driving and the zoom driving can be performed simultaneously, the sequence goes to the step 153. On the other hand, if the power source voltage is lower than the given voltage, since the AF driving and the zoom driving cannot be performed simultaneously, the AF driving is continued, and then the sequence returns to the step 103 without performing the zoom driving.

In the step 153, it is discriminated whether the power zoom switch 63 is turned ON at the a side or at the c side. If the switch is at the a side, it is judged that the driving should be done in the direction toward the telephoto side, whereas, if the switch is at the c side, it is judged that the driving should be done in the direction toward the wide-angle side. Thereafter, the sequence goes to a step 154.

In the step 154, the zoom driving is performed toward the direction discriminated in the step 153, and then the sequence returns to the step 103, from where the operations mentioned above are repeated.

Next, the operation at the initiation of the AF driving will be explained.

Figure 15:
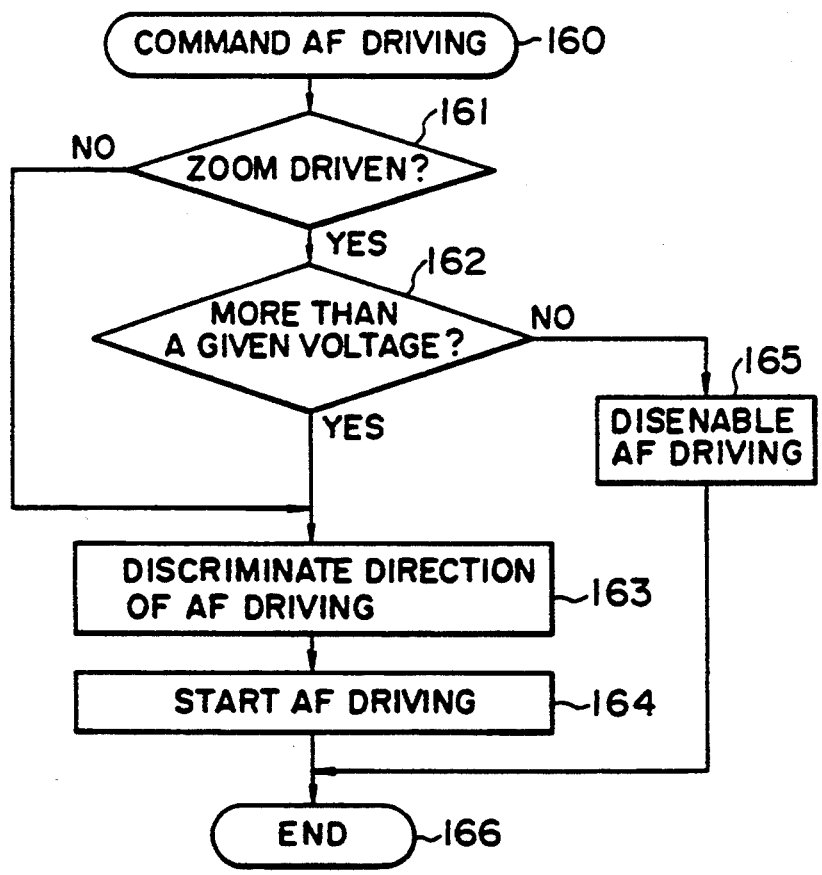

FIG. 15 is a flowchart showing the offering operation regarding the AF driving command.

In a step 160, when the offering of the AF driving command is entered, the sequence goes to a step 161, where it is judged whether the zoom driving is being performed. If the zoom driving is not performed, the sequence goes to a step 163, whereas, if the zoom driving is being performed, the sequence goes to a step 162.

In the step 162, if the power source voltage is more than the given voltage, since the AF driving and the zoom driving can be performed simultaneously, the sequence goes to the step 163. On the other hand, if the power source voltage is below the given voltage, since the AF driving and the zoom driving cannot be performed simultaneously, the zoom driving is continued. Thereafter, the sequence goes to a step 165 without executing the AF driving, where the signal representing the fact that the AF driving cannot be performed is sent to the microcomputer 10 of the camera body 1, and then goes to a step 166, where the offering operation is finished.

In the step 163, the driving direction sent from the camera body 1 is discriminated. Then, the sequence goes to a step 164 where the AF driving is started, and then goes to the step 166, thus finishing the offering operation.

In the above second and third embodiments of the invention, even if the AF driving and the zoom driving were performed simultaneously, the consumed current corresponded to the current consumed by a single motor. Accordingly, the battery might be small-sized, and, thus, it was possible to make the camera system more small-sized and to increase the number of pictures to be taken due to the lesser energy consumption.

According to the fourth embodiment of the present invention, since when the power source voltage is high (in other words, when the battery is new) the simultaneous execution of the AF driving and the zoom driving is permitted and when the power source voltage is decreased (i.e., when the battery becomes old) the simultaneous execution of the AF driving and the zoom driving is prohibited, the power source can be effectively utilized and a small battery 18 can be used, thus making the camera system itself small-sized. Further, since the camera system is so constructed that at least the photo-taking operation can be effected even if the power source voltage is decreased, the number of pictures to be taken will be increased.

Further, in the above-mentioned second and third embodiments, while the camera system is constructed such that the consumed current corresponded to the current consumed by a single motor when the AF driving and the zoom driving were simultaneously performed, by using the duty control or the constant current control (which may be the constant voltage control), it may include a voltage detecting circuit as shown in the fourth embodiment and may be constructed that the above controls are carried out only when the fact that the power source voltage is decreased below the predetermined value is detected by the voltage detecting circuit. In this way, the camera can meet the requirements regarding substantially all of the shutter chances.

Further, in the fourth embodiment, while an example that the compactness of the camera system can be attained by prohibiting the simultaneous execution of the AF driving and the zoom driving when the power source voltage is below the predetermined value has been explained, the camera system may include any circuits for performing the duty control and/or the constant current control shown in the second and third embodiments and may be constructed that such controls are carried out when the power source voltage is maintained between a first predetermined value and a second predetermined value smaller than the first one. In this way, the camera system can meet the requirements regarding substantially all of the shutter chances more effectively in comparison with the camera system of the fourth embodiment.

Further, in the above-mentioned second and third embodiments, while means for performing the duty control and/or the constant current control were arranged at the interchangeable lens side 50, these means may be arranged at the camera body side 1. Similarly, in the fourth embodiment, while the voltage detecting circuit was arranged at the interchangeable lens side 50, it may be arranged at the camera body side 1.

As mentioned above, according to the second, third and fourth embodiments of the present invention, by providing the drive control means for carrying out the AF driving and the zoom driving with the consumption current smaller than that consumed by simultaneously and independently performing the AF and zoom drivings, the simultaneous execution of the power zoom driving and the AF driving can be effected with the current which is equal to the current consumed by performing either one of these drivings; and by providing the power source voltage detecting means for discriminating whether the voltage of the battery is more than or below the predetermined value, and the operation control means for prohibiting the simultaneous execution of the power zoom and AF drivings when the fact that the power source voltage is below the predetermined value is detected by the voltage detecting means, either of the AF driving or the power zoom driving can be prevented when the power source voltage is below the predetermined value so that the small battery can be effectively used. Accordingly, it is possible to solve the problem that the normal photo-taking cannot be carried out, to make the camera system more small-sized and lighter, and to make the camera system stronger with respect to the shutter chances.

Next, a fifth embodiment of the present invention will be explained.

Since the construction of the camera system according to the fifth embodiment is substantially the same as that shown in FIG. 1 except that the microcomputer 10 does not include the large current consumption detecting sectin 10a and the lens movement control section 10b, the detailed explanation thereof will be omitted.

Figure 16:
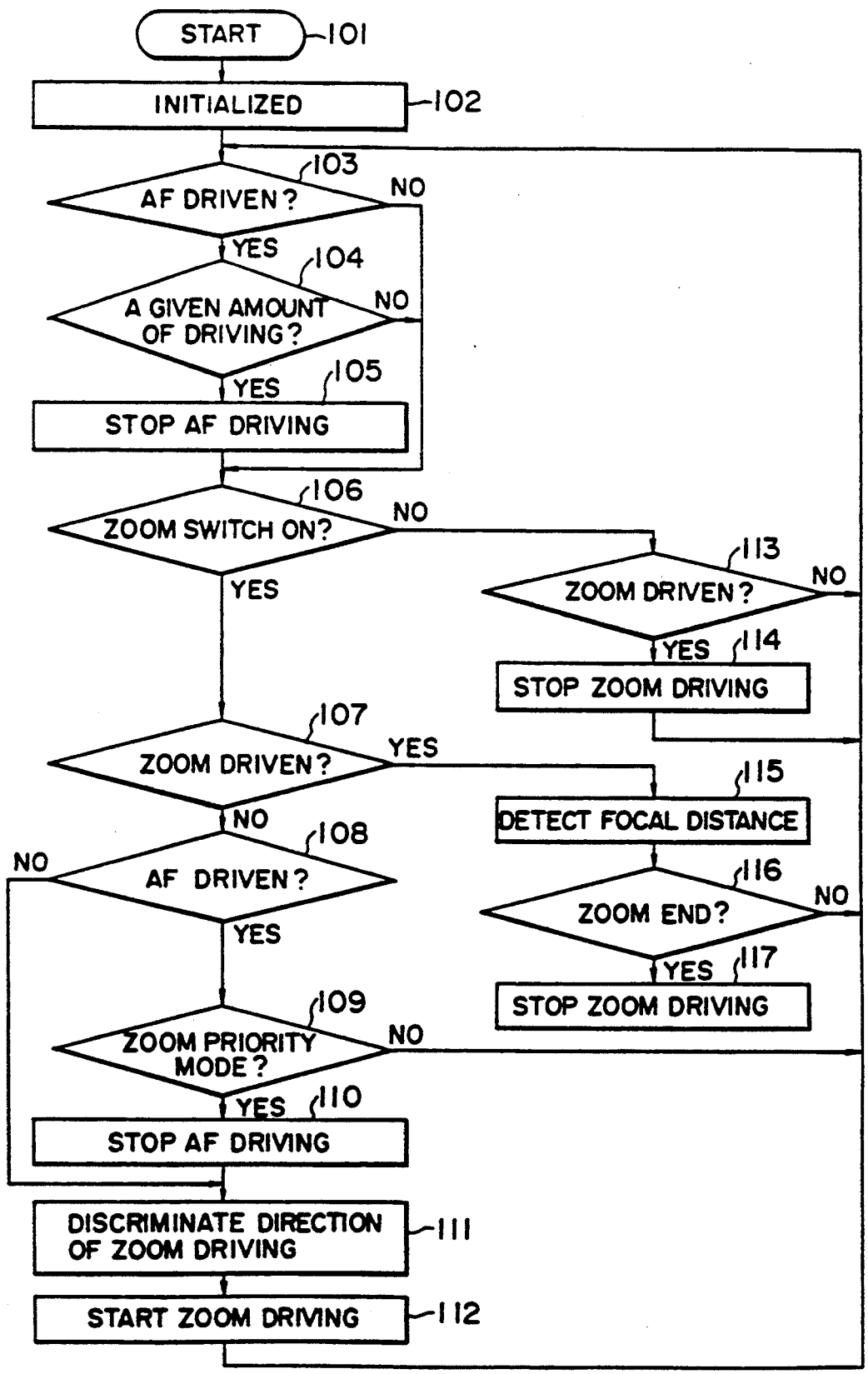
FIG. 16 is a flowchart showing the operation of a camera system according to a fifth embodiment of the present invention.

Hereinafter, the fifth embodiment of the invention will be fully explained with reference to a main flowchart of the microcomputer 55 at the interchangeable lens side 50 as shown in FIG. 16.

When the power source is turned ON, the microcomputer 55 starts the sequence from a step 101 and goes to a step 102, where various circuits within and outside the microcomputer are initialized.

Then, the sequence goes to a step 103, where it is judged whether the AF driving is being performed. If the AF driving is being performed, the sequence goes to a step 104, otherwise, to a step 106.

In the step 104, the value in the counter is read to determine the AF driving amount, and the read value is compared with a desired AF driving amount sent from the camera body side 1. If the read value reaches the desired amount, the sequence goes to a step 105 where the AF driving is stopped, and then goes to the step 106. On the other hand, if the read value does not reach the desired AF driving amount, the sequence goes to the step 106.

In the step 106, the condition of the power zoom switch 63 is judged, and if the switch is turned ON either a side or c side, the sequence goes to a step 107; whereas, if the switch is turned OFF, the sequence goes to a step 113.

In the step 113, it is judged whether the zoom driving is being performed. If the zoom driving is not performed, the sequence returns to the step 103 and the operations mentioned above are repeated. On the other hand, if the zoom driving is being performed, the sequence goes to a step 114 where the zoom driving is stopped, and then returns to the step 103.

If the power zoom switch is turned ON in the step 106, the sequence goes to the step 107, where it is judged whether the zoom driving is being performed. If the zoom driving is being performed, the sequence goes to a step 115 where the focal length is detected from the encoder 59 for detecting the focal length of the lens, and then goes to a step 116.

In the step 116, if the focal length being detected is situated in the zoom end toward which the zoom driving is directed, since a further zoom driving cannot be effected, the sequence goes to a step 117 where the zoom driving is stopped, and then returns to the step 103. On the other hand, if the focal length is not situated in the zoom end toward which the zoom driving is directed, the zoom driving is further continued, and then the sequence returns to the step 103.

If the zoom driving is not performed in the step 107, the sequence goes to a step 108 to initiate the zoom driving.

In the step 108, it is judged whether the AF driving is being performed. If the AF driving is not performed, the sequence goes to a step 111, whereas, if the AF driving is being performed, the sequence goes to a step 109.

In the step 109, a condition of the change-over switch 64 is detected and it is judged whether the AF priority mode or the zoom priority mode is available. If the AF priority mode is available, the AF driving is continued without performing the zoom driving, and then the sequence returns to the step 103. On the other hand, if the zoom priority mode is available, the sequence goes to a step 110 where the AF driving is stopped, and then the sequence goes to the step 111.

In the step 111, it is discriminated whether the power zoom switch 63 is turned ON at the a side or at the c side. If the switch is at the a side, it is judged that the driving should be done in the direction toward the telephoto side, whereas, if the switch is at the c side, it is judged that the driving should be done in the direction toward the wide-angle side. Thereafter, the sequence goes to a step 112.

In the step 112, the zoom driving is started to the driving direction determined in the step 111. Then the sequence returns to the step 103, and the sequential operations described above are repeated.

Next, the operation at the initiation of the AF driving will be explained.

When the microcomputer 55 at the interchangeable lens side 50 receives the AF driving command and the AF driving amount from the microcomputer 10 at the camera body side 1 through the communication therebetween, the microcomputer 55 initiates the AF driving by using a known offering technique.

Since a flowchart showing the offering operation regarding the AF driving command is the same as that shown in FIG. 4, the explanation thereof will be omitted.

According to the fifth embodiment of the present invention, since, in the zoom priority mode, if the AF driving is being performed when the zoom driving should be performed, the AF driving is stopped and the zoom driving is performed (steps 108→109→110→111→. . . in FIG. 16, and steps 121→122→126→. . . in FIG. 4), and, in the AF priority mode, if the zoom driving is being performed when the AF driving should be performed, the zoom driving is stopped and the AF driving is performed (steps 121→122→123→124→. . . in FIG. 4, and steps 108→109→103→. . . in FIG. 16), i.e., since the simultaneous execution of the power zoom driving and the AF driving is prohibited, the power source can be made small-sized and the normal or correct operation can be ensured. Further, since the power source can be utilized effectively, the number of exposures which can be properly photo-taken can be increased.

Further, for example, if the zoom driving is carried out while the AF driving is being performed, an image on the distance sensor 16 is varied or changed, which frequently leads in the incorrect distance measuring. However, according to the fifth embodiment of the invention, since the zoom driving is prohibited when the AF priority mode is selected, the image on the distance sensor 16 is not varied, and, thus, it is possible to measure the distance correctly. That is to say, since not only the simultaneous execution of the AF driving and the zoom driving is prohibited but also any one of these drivings can be preferentially performed, it is possible to take a photograph more properly.

As mentioned above, according to the fifth embodiment of the present invention, by providing the operation control means for prohibiting the simultaneous execution of the power zoom driving and the AF driving, the power zoom driving is prohibited while the AF driving is being performed and the AF driving is prohibited while the power zoom driving is being performed; and by providing the selection means for selecting the power zoom priority mode and the AF priority mode, and the priority instructing means for preferentially performing the power zoom driving to the AF driving when the power zoom priority mode is selected and for preferentially performing the AF driving to the power zoom driving when the AF priority mode is selected, the respective driving can be at any desired timing. Accordingly, the small battery can be utilized effectively and it is possible to always carry out the proper photo-taking.

Next, a sixth embodiment of the present invention will be explained.

Prior to the explanation of the construction of the sixth embodiment of the invention, a prior art relating to this embodiment will be explained.

In a conventional photo-taking apparatus of the power zoom type, the following two methods for stopping the zoom driving at the telephoto end and at the wideangle end were adopted.

In the first method, mechanical contact switches such as limit switches are arranged at positions corresponding to the telephoto end and the wide-angle end, and a zoom driving motor is stopped when the fact that a moving member such as a magnification changing lens holder is engaged by the mechanical switch during the zoom driving is detected.

In the second method, the rotating amount of a zoom driving motor during the zoom driving is detected by a conventional encoder as electric pulses, and the zoom driving motor is stopped when the sum of the number of pulses corresponds to a distance up to the telephoto end and wide-angle end.

In case of the above first method, if the switches are positioned with very high accuracy, the magnification changing lens holder can be correctly stopped at the position corresponding to the telephoto end or the wide-angle end. However, in the actual manufacturing process, since it is impossible to position the switches at the desired positions with very high accuracy, the first method leads to the following drawbacks.

That is to say, if the switches are arranged ahead of the telephoto end and/or the wide-angle end, since the switch is activated before the magnification changing lens holder reaches the telephoto end or wide-angle end to stop the zoom driving motor, the magnification changing lens holder will be stopped before it reaches the telephoto end or wide-angle end.

On the other hand, if the switches are arranged beyond the telephoto end and/or the wide-angle end, since the switch is not activated when the magnification changing lens holder reaches the telephoto end or wide-angle end, the energization of the zoom driving motor is continued, with the result that the excessive load is applied to the power transmission mechanism and/or the useless electric power is consumed.

On the other hand, in case of the above second method, since it is necessary to provide a specific motor control circuit for correctly stopping the zoom driving motor when a means for detecting the rotational amount of the zoom driving motor and/or the magnification changing lens reaches the telephoto end or the wide-angle end, the manufacturing cost is increased.

An object of the sixth embodiment of the present invention is to provide an improved zoom driving controlling method which can eliminate the incorrect stop position and avoid an increase in the manufacturing cost.

Hereinafter, the sixth embodiment of the present invention will be fully explained.

Since the construction of the camera system according to the sixth embodiment is substantially the same as that shown in FIG. 1 except that the microcomputer 10 does not include the large current consumption detecting section 10a and the lens movement control section 10b, the detailed explanation thereof will be omitted.

Figure 17:
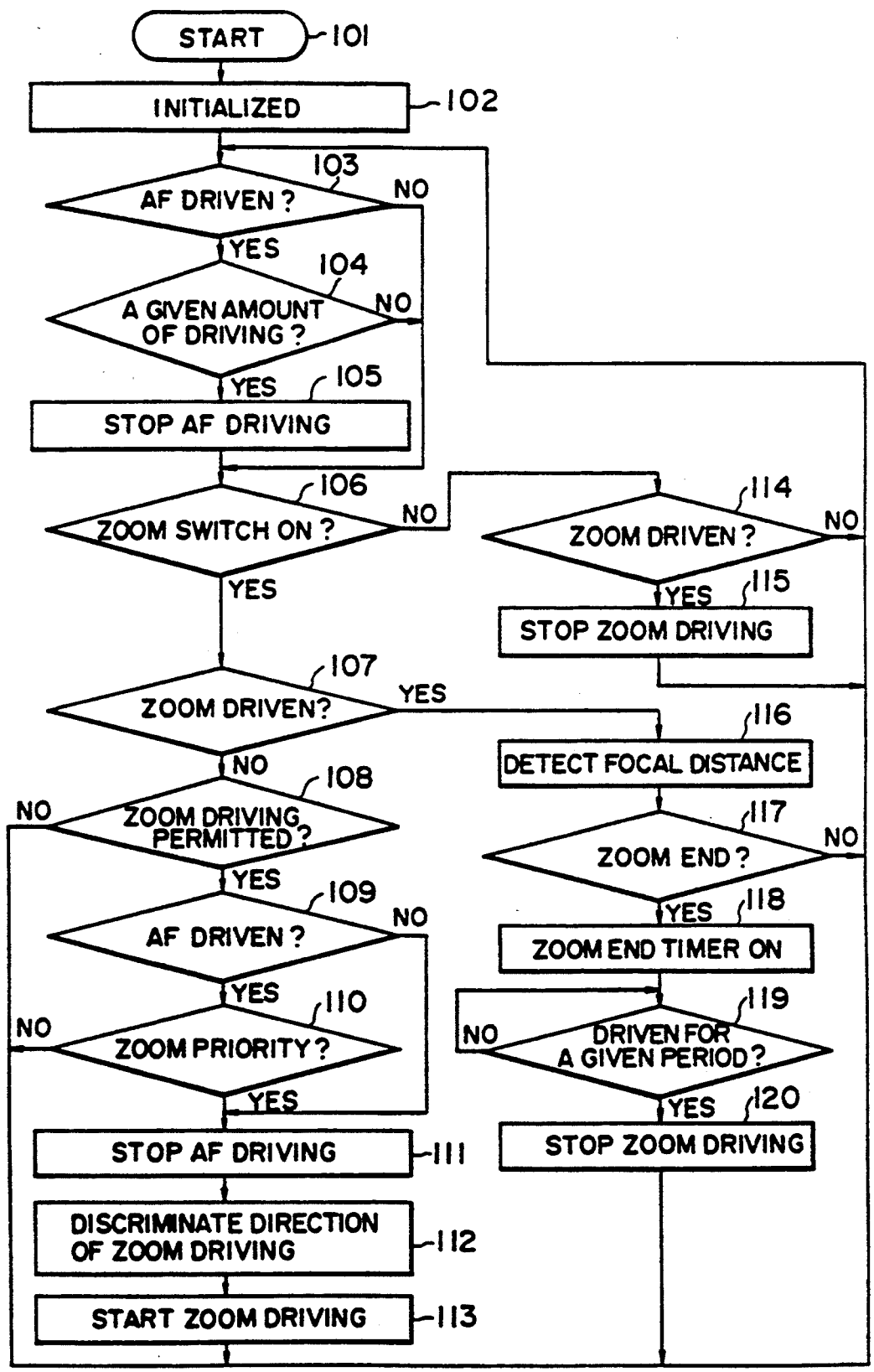
FIG. 17 is a flowchart showing the operation of a camera system according to a sixth embodiment of the present invention.

FIG. 17 shows a main flowchart of the microcomputer 55 at the interchangeable lens side.

When the power source is turned ON, the microcomputer 55 starts the sequence from a step 101 and goes to a step 102, where various circuits within and outside the microcomputer are initialized.

Then, the sequence goes to a step 103, where it is judged whether the AF driving is being performed. If the AF driving is being performed, the sequence goes to a step 104, otherwise, to a step 106.

In the step 104, the value in the counter 62 is read to determine the AF driving amount, and the read value is compared with a desired AF driving amount sent from the camera body side 1. If the read value reaches the desired amount, the sequence goes to a step 105 where the AF driving is stopped, and then goes to the step 106. On the other hand, if the read value does not reach the desired AF driving amount, the AF driving is continued, and then the sequence goes to the step 106.

In the step 106, the condition of the power zoom switch 63 is judged, and if the switch is turned ON either a side or c side, the sequence goes to a step 107; whereas, if the switch is turned OFF, the sequence goes to a step 114. In the step 114, it is judged whether the zoom driving is being performed. If the zoom driving is not performed, the sequence returns to the step 103 and the operations mentioned above are repeated. On the other hand, if the zoom driving is being performed, since the power zoom switch is turned OFF, the sequence goes to a step 115 where the zoom driving is stopped, and then returns to the step 103.

Then, if the power zoom switch is turned ON in the step 106, the sequence goes to the step 107, where it is judged whether the zoom driving is being performed. If the zoom driving is being performed, the sequence goes to a step 116 where the focal length is detected from the encoder 59 for detecting the focal length of the lens, and then goes to a step 117.

In the step 117, the lens is driven toward the wide-angle side, when the focal length near the wide-angle end is detected, since the lens will soon reach the wide-angle end, the sequence goes to a step 118 where a zoom end timer in the microcomputer is turned ON, and then goes to a step 119. On the other hand, in the step 118, if the focal length is not situated in wide-angle end, the sequence returns to the step 103.

Here, while an example that the lens is driven toward the wide-angle side was explained, similarly, if the lens is driven toward the telephoto side, when the fact that the focal length is situated at the telephoto end is detected, the zoom end timer is turned ON, and the sequence goes to the step 119.

In the step 119, it is judged whether the zoom timer turned ON in the step 118 is driven for a given period or not. If not, the sequence returns to the step 119 again. On the other hand, if the timer is driven for the given period, the sequence goes to a step 120, where the zoom driving is stopped.

On the other hand, if the zoom driving is not performed in the step 107, the sequence goes to a step 108 to initiate the zoom driving, where it is judged whether the zoom driving is permitted or prohibited.

If the zoom driving is prohibited, the sequence returns to the step 103, whereas, if the zoom driving is permitted, the sequence goes to a step 109. Incidentally, when the camera body requires the large electric power, the zoom prohibition command is sent from the microcomputer 10 of the camera body to the microcomputer 55 of the interchangeable lens through the serial communication therebetween.

In the step 109, it is judged whether the AF driving is being performed. If the AF driving is not performed, the sequence goes to a step 111, whereas, if the AF driving is being performed, the sequence goes to a step 110. In the step 110, a condition of the switch 64 is detected and it is judged whether the AF priority mode or the zoom priority mode is available. If the AF priority mode is available, the AF driving is continued without performing the zoom driving, and then the sequence returns to the step 103. On the other hand, if the zoom priority mode is available, the sequence goes to the step 111 where the AF driving is stopped, and then goes to a step 112.

In the step 112, it is discriminated whether the zoom switch 63 is turned ON either at the a side or at the c side. If the switch is at the a side, it is judged that the driving should be done in the direction toward the telephoto side, whereas, if the switch is at the c side, it is judged that the driving should be done in the direction toward the wide-angle side, and then the sequence goes to a step 113. In the step 113, the zoom driving is started in the driving direction discriminated in the step 112, and then the sequence returns to the step 103, from where the above-mentioned operations are repeated.

As mentioned above, in the zoom driving control method shown in the sixth embodiment of the present invention, since when the focal length detecting means detects the focal length situated nearest the wide-angle end or the telephoto end, the zoom end timer arranged in the microcomputer is turned ON, whereby the zoom driving is stopped for the given period, the zoom driving can be effectively stopped without using any additional elements for detecting the zoom end or without adjusting the zoom end.

What is claimed is:

1. A camera having first and second motors, comprising:
   a focus driving mechanism for performing a focusing operation using the first motor as a first driving source;
   a zoom driving mechanism for performing a zooming operation using the second motor as a second driving source;
   a prohibition circuit for prohibiting a simultaneous driving of the first and second motors; and
   a selection circuit for selectively giving a priority in driving to one of the first and second motors when said prohibition circuit prohibits the simultaneous driving of said first and second motors.

2. A camera according to claim 1, further comprising:
   a first operation switch for starting an operation of said focus driving mechanism; and
   a second operation switch for starting an operation of said zoom driving mechanism.

3. A camera according to claim 1, further comprising a change-over switch, and wherein said selection circuit determines which of the first motor and the second motor is given the driving priority in accordance with an operation of said change-over switch.

4. A camera according to claim 1, wherein said camera further comprises a camera body portion and an interchangeable lens portion, the camera body portion and the interchangeable lens portion respectively comprising first and second microcomputers, and wherein the first and second motors are controlled by said first and second microcomputers.

5. A camera according to claim 4, wherein the first and second motors are disposed in the interchangeable lens portion.

6. A camera according to claim 2, wherein said camera comprises a camera body portion and an interchangeable lens portion, said first operation switch being disposed in the camera body portion and said second operation switch being disposed in the interchangeable lens portion.

7. A camera according to claim 3, wherein said camera comprises a camera body portion and an interchangeable lens portion, said change-over switch being disposed in the interchangeable lens portion.

8. An interchangeable lens mountable on a camera body, said lens comprising:
   a first motor;
   a second motor;
   a focus driving mechanism for performing a focusing operation using said first motor as a first driving source;
   a zoom driving mechanism for performing a zooming operation using said second motor as a second driving source;
   a prohibition circuit for prohibiting simultaneous driving of said first and second motors; and
   a selection circuit for selectively giving a priority in driving to one of said first and second motors when said prohibition circuit prohibits the simultaneous driving of said first and second motors.

9. An interchangeable lens according to claim 8, further comprising:
   a first operation switch for starting an operation of said focus driving mechanism; and
   a second operation switch for starting an operation of said zoom driving mechanism.

10. An interchangeable lens according to claim 8, further comprising a change-over switch, and wherein said selection circuit determines which of said first motor and said second motor is given the driving priority in accordance with an operation of said change-over switch.

11. A camera having first and second actuators, comprising:
    a first driving mechanism for performing a first lens driving operation using the first actuator as a first driving source;
    a second driving mechanism for performing a second lens driving operation using the second actuator as a second driving source;
    a prohibition circuit for prohibiting a simultaneous driving of the first and second actuators; and
    a selection circuit for selectively establishing a driving priority for one of the first and second actuators when said prohibition circuit prohibits the simultaneous driving of the first and second actuators.

12. A camera according to claim 11, further comprising:
    a first operation switch for starting an operation of said first driving mechanism; and
    a second operation switch for starting an operation of said driving mechanism.

13. An interchangeable lens detachably mountable on a camera body, said lens comprising:
    a first actuator;
    a second actuator;
    a first lens driving mechanism for performing a first lens driving operation using said first actuator as a first driving source;
    a second lens driving mechanism for performing a second lens driving operation using said second actuator as a second driving source;
    a prohibition circuit for prohibiting simultaneous driving of said first and second actuators; and
    a selection circuit for selectively establishing a driving priority for one of said first and second actuators when said prohibition circuit prohibits the simultaneous driving of said first and second actuators.

14. An interchangeable lens according to claim 13, further comprising:
    a first operation switch for starting an operation of said first lens driving mechanism; and
    a second operation switch for starting an operation of said second lens driving mechanism.

15. A camera having first and second actuators, comprising:
    a first driving mechanism for performing a first lens driving operation using the first actuator as a first driving source;
    a second driving mechanism for performing a second lens driving operation using the second actuator as a second driving source;
    a first operation switch for starting said first lens driving operation of said first driving mechanism;
    a second operation switch for starting said second lens driving operation of said second driving mechanism; and
    a prohibition circuit for prohibiting a simultaneous driving of the first and second actuators regardless of the operation of at least one of said first operation switch and said second operation switch.

* * * * *

UNITED STATES PATENT AND TRADEMARK OFFICE
CERTIFICATE OF CORRECTION

PATENT NO. : 5,404,191
DATED : April 4, 1995
INVENTOR(S) : RITSUO KASHIYAMA, ET AL.

It is certified that error appears in the above-indentified patent and that said Letters Patent is hereby corrected as shown below:   On drawing sheet,
Figure 2A:
    "/DISTARCE" should read --/DISTANCE--.
Column 1,
    line 45, "detects," should read --detects--; and
    line 46, "for" should be deleted.
Column 2,
    line 25, "FIG. 8 to 11" should read --FIGS 9 to 11--.
Column 7,
    line 31, "the" should be deleted.
Column 8,
    line 7, "more" should be deleted; and
    line 40, "is" should read --are--.
Column 9,
    line 21, "side 1o" should read --side 1.--;
    line 35, "is" should read --are--; and
    line 65, "is-discriminated" should read --is discriminated--; and.
Column 11,
    line 44, "is" should read --are--; and
    line 45, "the" should be deleted.

Signed and Sealed this

Eighteenth Day of July, 1995

Attest:

BRUCE LEHMAN

Attesting Officer      Commissioner of Patents and Trademarks